United States Patent
Kakadjian et al.

(10) Patent No.: US 7,886,824 B2
(45) Date of Patent: *Feb. 15, 2011

(54) COMPOSITIONS AND METHODS FOR GAS WELL TREATMENT

(75) Inventors: Sarkis R. Kakadjian, San Antonio, TX (US); Frank Zamora, San Antonio, TX (US); Tina Garza, San Antonio, TX (US)

(73) Assignee: Clearwater International, LLC DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/237,130

(22) Filed: Sep. 24, 2008

(65) Prior Publication Data

US 2009/0200027 A1 Aug. 13, 2009

Related U.S. Application Data

(63) Continuation of application No. 12/029,335, filed on Feb. 11, 2008.

(51) Int. Cl.
*E21B 43/22* (2006.01)
*E21B 43/26* (2006.01)
*C09K 8/584* (2006.01)

(52) U.S. Cl. .............. 166/300; 166/270.1; 166/305.1; 166/308.2; 507/254; 507/266; 175/65

(58) Field of Classification Search ........................ None
See application file for complete search history.

(56) References Cited

U.S. PATENT DOCUMENTS

| | | | |
|---|---|---|---|
| 2,196,042 A | 4/1940 | Timpson | 23/11 |
| 2,390,153 A | 12/1945 | Kern | 260/72 |
| 3,059,909 A | 10/1962 | Wise | 261/39.3 |
| 3,163,219 A | 12/1964 | Wyant et al. | 166/283 |
| 3,301,723 A | 1/1967 | Chrisp | 149/20 |
| 3,301,848 A | 1/1967 | Halleck | 536/123.1 |
| 3,303,896 A | 2/1967 | Tillotson et al. | 175/69 |
| 3,317,430 A | 5/1967 | Priestley et al. | 510/503 |
| 3,565,176 A | 2/1971 | Wittenwyler | 166/270 |
| 3,856,921 A | 12/1974 | Shrier et al. | 423/228 |
| 3,888,312 A | 6/1975 | Tiner et al. | 166/308.5 |
| 3,933,205 A | 1/1976 | Kiel | 166/308.1 |
| 3,937,283 A | 2/1976 | Blauer et al. | 166/307 |

(Continued)

FOREIGN PATENT DOCUMENTS

CA 2125513 1/1995

(Continued)

OTHER PUBLICATIONS

Sartori, F. and Savage, D.W., Sterically Hindered Amines for CO2 Removal from Gases, Ind. Eng. Chem. Fundam. 1983, 22, 239-249.

(Continued)

*Primary Examiner*—Zakiya W. Bates
(74) *Attorney, Agent, or Firm*—Robert W Strozier

(57) ABSTRACT

A microemulsion system is disclosed which comprises a solvent subsystem, a co-solvent subsystem and a surfactant subsystem comprises at least one monoalkyl branched propoxy sulfate anionic surfactant, where the microemulsion system are useful in drilling, producing, remediation, and fracturing application to reduce water blocks and water blocking in formation of a producing formation.

31 Claims, 5 Drawing Sheets

U.S. PATENT DOCUMENTS

| | | | |
|---|---|---|---|
| 3,960,736 A | 6/1976 | Free et al. | 507/216 |
| 3,965,982 A | 6/1976 | Medlin | 166/249 |
| 3,990,978 A | 11/1976 | Hill | 507/235 |
| 4,007,792 A | 2/1977 | Meister | 166/308.2 |
| 4,052,159 A | 10/1977 | Fuerst et al. | |
| 4,067,389 A | 1/1978 | Savins | 166/246 |
| 4,108,782 A | 8/1978 | Thompon | 507/205 |
| 4,112,050 A | 9/1978 | Sartori et al. | 423/223 |
| 4,112,051 A | 9/1978 | Sartori et al. | 423/223 |
| 4,112,052 A | 9/1978 | Sartori et al. | 423/223 |
| 4,113,631 A | 9/1978 | Thompson | 507/202 |
| 4,378,845 A | 4/1983 | Medlin et al. | 166/297 |
| 4,461,716 A | 7/1984 | Barbarin et al. | 252/307 |
| 4,479,041 A | 10/1984 | Fenwick et al. | 200/81 R |
| 4,506,734 A | 3/1985 | Nolte | 166/308.1 |
| 4,514,309 A | 4/1985 | Wadhwa | 507/211 |
| 4,541,935 A | 9/1985 | Constien et al. | 507/225 |
| 4,549,608 A | 10/1985 | Stowe et al. | 166/280.1 |
| 4,561,985 A | 12/1985 | Glass, Jr. | 507/108 |
| 4,623,021 A | 11/1986 | Stowe | 166/250.1 |
| 4,654,266 A | 3/1987 | Kachnik | 428/403 |
| 4,657,081 A | 4/1987 | Hodge | 166/380.5 |
| 4,660,643 A | 4/1987 | Perkins | 166/283 |
| 4,683,068 A | 7/1987 | Kucera | 507/201 |
| 4,686,052 A | 8/1987 | Baranet et al. | 507/244 |
| 4,695,389 A | 9/1987 | Kubala | 507/244 |
| 4,705,113 A | 11/1987 | Perkins | 166/302 |
| 4,714,115 A | 12/1987 | Uhri | 166/308.1 |
| 4,718,490 A | 1/1988 | Uhri | 166/281 |
| 4,724,905 A | 2/1988 | Uhri | 166/250.1 |
| 4,725,372 A | 2/1988 | Teot et al. | 507/129 |
| 4,739,834 A | 4/1988 | Peiffer et al. | 166/308.4 |
| 4,741,401 A | 5/1988 | Walles et al. | 166/300 |
| 4,748,011 A | 5/1988 | Baize | 423/228 |
| 4,779,680 A | 10/1988 | Sydansk | 166/300 |
| 4,795,574 A | 1/1989 | Syrinek et al. | 507/238 |
| 4,817,717 A | 4/1989 | Jennings, Jr. et al. | 166/278 |
| 4,830,106 A | 5/1989 | Uhri | 166/250.1 |
| 4,846,277 A | 7/1989 | Khalil et al. | 166/280.1 |
| 4,848,468 A | 7/1989 | Hazlett et al. | 166/300 |
| 4,852,650 A | 8/1989 | Jennings, Jr. et al. | 166/250.1 |
| 4,869,322 A | 9/1989 | Vogt, Jr. et al. | 166/280.1 |
| 4,892,147 A | 1/1990 | Jennings, Jr. et al. | 166/280.2 |
| 4,926,940 A | 5/1990 | Stromswold | 166/247 |
| 4,938,286 A | 7/1990 | Jennings, Jr. | 166/280.1 |
| 4,978,512 A | 12/1990 | Dillon | 423/226 |
| 5,005,645 A | 4/1991 | Jennings, Jr. et al. | 166/280.1 |
| 5,024,276 A | 6/1991 | Borchardt | 166/308.6 |
| 5,067,556 A | 11/1991 | Fudono et al. | 62/196.4 |
| 5,074,359 A | 12/1991 | Schmidt | 166/280.1 |
| 5,074,991 A | 12/1991 | Weers | 208/236 |
| 5,082,579 A | 1/1992 | Dawson | 507/211 |
| 5,106,518 A | 4/1992 | Cooney et al. | 507/21 |
| 5,110,486 A | 5/1992 | Manalastas et al. | 507/260 |
| 5,169,411 A | 12/1992 | Weers | 44/421 |
| 5,224,546 A | 7/1993 | Smith et al. | 166/300 |
| 5,228,510 A | 7/1993 | Jennings, Jr. et al. | 166/263 |
| 5,246,073 A | 9/1993 | Sandiford et al. | 166/295 |
| 5,259,455 A | 11/1993 | Nimerick et al. | 166/308.5 |
| 5,330,005 A | 7/1994 | Card et al. | 166/280.2 |
| 5,342,530 A | 8/1994 | Aften et al. | 252/8.551 |
| 5,347,004 A | 9/1994 | Rivers et al. | 544/180 |
| 5,363,919 A | 11/1994 | Jennings, Jr. | 166/308.1 |
| 5,402,846 A | 4/1995 | Jennings, Jr. et al. | 166/259 |
| 5,411,091 A | 5/1995 | Jennings, Jr. | 166/280.1 |
| 5,424,284 A | 6/1995 | Patel et al. | 507/129 |
| 5,439,055 A | 8/1995 | Card et al. | 166/280.2 |
| 5,462,721 A | 10/1995 | Pounds et al. | 423/226 |
| 5,465,792 A | 11/1995 | Dawson et al. | 166/295 |
| 5,472,049 A | 12/1995 | Chaffe et al. | 166/250.1 |
| 5,482,116 A | 1/1996 | El-Rabaa et al. | 166/250.1 |
| 5,488,083 A | 1/1996 | Kinsey, III et al. | 507/211 |
| 5,497,831 A | 3/1996 | Hainey et al. | 166/308.1 |
| 5,501,275 A | 3/1996 | Card et al. | 166/280.2 |
| 5,549,840 A | 8/1996 | Mondin et al. | |
| 5,551,516 A | 9/1996 | Norman et al. | 166/308.2 |
| 5,593,958 A | 1/1997 | Mondin et al. | |
| 5,599,785 A | 2/1997 | Mondin et al. | |
| 5,610,130 A | 3/1997 | Thomas et al. | |
| 5,624,886 A | 4/1997 | Dawson et al. | 507/217 |
| 5,635,458 A | 6/1997 | Lee et al. | 507/240 |
| 5,649,596 A | 7/1997 | Jones et al. | 166/300 |
| 5,669,447 A | 9/1997 | Walker et al. | 166/300 |
| 5,674,377 A | 10/1997 | Sullivan, III et al. | 208/208 R |
| 5,688,478 A | 11/1997 | Pounds et al. | 423/228 |
| 5,693,837 A | 12/1997 | Smith et al. | 556/148 |
| 5,711,396 A | 1/1998 | Joerg et al. | 180/444 |
| 5,716,925 A | 2/1998 | Mondin et al. | |
| 5,722,490 A | 3/1998 | Ebinger | 166/281 |
| 5,731,281 A | 3/1998 | Mondin et al. | |
| 5,741,760 A | 4/1998 | Mondin et al. | |
| 5,744,024 A | 4/1998 | Sullivan, III et al. | 208/236 |
| 5,755,286 A | 5/1998 | Ebinger | 166/281 |
| 5,759,983 A | 6/1998 | Mondin et al. | |
| 5,763,386 A | 6/1998 | Mondin et al. | |
| 5,775,425 A | 7/1998 | Weaver et al. | 166/276 |
| 5,776,880 A | 7/1998 | Mondin et al. | |
| 5,787,986 A | 8/1998 | Weaver et al. | 166/280.2 |
| 5,806,597 A | 9/1998 | Tjon-Joe-Pin et al. | 166/300 |
| 5,807,812 A | 9/1998 | Smith et al. | 507/238 |
| 5,833,000 A | 11/1998 | Weaver et al. | 166/276 |
| 5,853,048 A | 12/1998 | Weaver et al. | 166/279 |
| 5,854,193 A | 12/1998 | Mondin et al. | |
| 5,861,367 A | 1/1999 | Blanvalet et al. | |
| 5,869,325 A | 2/1999 | Crabtree et al. | |
| 5,871,049 A | 2/1999 | Weaver et al. | 166/276 |
| 5,877,127 A | 3/1999 | Card et al. | 507/273 |
| 5,908,073 A | 6/1999 | Nguyen et al. | 166/276 |
| 5,908,814 A | 6/1999 | Patel et al. | 507/131 |
| 5,952,281 A | 9/1999 | Mondin et al. | |
| 5,964,295 A | 10/1999 | Brown et al. | 166/308.2 |
| 5,979,557 A | 11/1999 | Card et al. | 166/300 |
| 5,980,845 A | 11/1999 | Cherry | 423/229 |
| 5,985,814 A | 11/1999 | Zocchi et al. | |
| 6,016,871 A | 1/2000 | Burts, Jr. | 166/300 |
| 6,017,868 A | 1/2000 | Mondin et al. | |
| 6,020,296 A | 2/2000 | Mertens et al. | |
| 6,035,936 A * | 3/2000 | Whalen | 166/308.3 |
| 6,047,772 A | 4/2000 | Weaver et al. | 166/276 |
| 6,054,417 A | 4/2000 | Graham et al. | 507/238 |
| 6,059,034 A | 5/2000 | Rickards et al. | 166/280.2 |
| 6,060,436 A | 5/2000 | Synder et al. | 507/266 |
| 6,069,118 A | 5/2000 | Hinkel et al. | 507/277 |
| 6,123,394 A | 9/2000 | Jeffrey | 299/16 |
| 6,133,205 A | 10/2000 | Jones | 507/276 |
| 6,147,034 A | 11/2000 | Jones et al. | 507/238 |
| 6,162,449 A | 12/2000 | Maier et al. | 424/401 |
| 6,162,766 A | 12/2000 | Muir et al. | 507/267 |
| 6,169,058 B1 | 1/2001 | Le et al. | 507/222 |
| 6,191,090 B1 | 2/2001 | Mondin et al. | |
| 6,228,812 B1 * | 5/2001 | Dawson et al. | 507/221 |
| 6,247,543 B1 | 6/2001 | Patel et al. | 175/64 |
| 6,267,938 B1 | 7/2001 | Warrender et al. | 423/226 |
| 6,283,212 B1 | 9/2001 | Hinkel et al. | 166/279 |
| 6,291,405 B1 | 9/2001 | Lee et al. | 507/136 |
| 6,330,916 B1 | 12/2001 | Rickards et al. | 166/280.2 |
| 6,725,931 B2 | 4/2004 | Nguyen et al. | 166/280.2 |
| 6,756,345 B2 | 6/2004 | Pakulski et al. | 507/246 |
| 6,793,018 B2 | 9/2004 | Dawson et al. | 166/300 |
| 6,832,650 B2 | 12/2004 | Nguyen et al. | 166/279 |
| 6,875,728 B2 | 4/2005 | Gupta et al. | 507/240 |
| 7,140,433 B2 | 11/2006 | Gatlin et al. | 166/250.01 |
| 7,268,100 B2 | 9/2007 | Kippie et al. | 507/244 |
| 7,350,579 B2 | 4/2008 | Gatlin et al. | 166/308.3 |

| | | | |
|---|---|---|---|
| 2002/0049256 A1 | 4/2002 | Bergeron, Jr. | 514/674 |
| 2002/0165308 A1 | 11/2002 | Kinniard et al. | 524/492 |
| 2003/0092581 A1 | 5/2003 | Crews | |
| 2003/0166472 A1* | 9/2003 | Pursley et al. | 507/200 |
| 2003/0220204 A1 | 11/2003 | Baran, Jr. et al. | 507/200 |
| 2004/0116304 A1* | 6/2004 | Wu et al. | 507/100 |
| 2005/0045330 A1 | 3/2005 | Nguyen et al. | 166/281 |
| 2005/0092489 A1 | 5/2005 | Welton et al. | 166/280.2 |
| 2005/0137114 A1 | 6/2005 | Gatlin et al. | 510/424 |
| 2005/0153846 A1 | 7/2005 | Gatlin | 208/236 |
| 2005/0250666 A1 | 11/2005 | Gatlin et al. | 510/492 |
| 2006/0194700 A1 | 8/2006 | Gatlin et al. | 507/203 |
| 2007/0032693 A1 | 2/2007 | Gatlin et al. | 507/239 |
| 2007/0129257 A1 | 6/2007 | Kippie et al. | 507/102 |
| 2007/0131425 A1 | 6/2007 | Gatlin et al. | 166/280.2 |
| 2007/0173413 A1 | 7/2007 | Lukocs et al. | 507/238 |
| 2007/0173414 A1 | 7/2007 | Wilson, Jr. | 507/131 |
| 2008/0039345 A1 | 2/2008 | Kippie et al. | 507/213 |

FOREIGN PATENT DOCUMENTS

| | | |
|---|---|---|
| CA | 2007965 | 2/1996 |
| DE | 4027300 | 5/1992 |
| EP | 0730018 A1 | 9/1996 |
| GB | 775376 | 10/1954 |
| GB | 816337 A | 7/1959 |
| GB | 1073338 A | 6/1967 |
| GB | 2368602 A | 5/2002 |
| JP | 10001461 | 6/1988 |
| JP | 08151422 | 11/1996 |
| JP | 10110115 A | 4/1998 |
| JP | 2005194148 A | 7/2005 |
| WO | WO 98/19774 | 5/1998 |
| WO | WO 98/56497 | 12/1998 |

OTHER PUBLICATIONS

Fushslueger, U., Socher, G., Grether, H.-J., Grasserbauer, M., Capillary Supercritical Fluid Chromatography/Mass Spectroscopy of Phenolic Mannich Bases with Dimethyl Ether Modified Ethane as Mobile Phase, Anal. Chem., 1999, 71, 2324-2333.

Kauffman, W.J., Observations on the Synthesis and Characterization of N,N',N -Tris-(dimethylaminopropyly)hexahydro-s-triazine and isolable intermediates, XP009005168, 1975.

Delepine, M., Effect of Hydrogen Sulfide on Trimethyltrimethyl Triamine, Bull. Soc. China., 1896, 14, 889-891 (English Translation).

Delepine, M., Effect of Hydrogen Sulfide and Trimethyltrimethyl Triamine, Ann. Chim. Phys., 1896, 4, 114-133 (English Translation).

Paquin, A.M., Reaction of Primary Amines with Aliphatic Aldehydes, Chem. Ber., 1949, 82, 316-326 (English Translation).

Castillo, M., Avila, Y.S., Rodrigues, R.E., Viloria, A., H2S Liquid Scavengers, Their Corrosivity Properites and the Compatibility with Other Down Stream Processes, Corrosion 2000, paper 00491.

Lower Cost Methods for Improved Oil Recovery (IOR) Via Surfactant Flooding, William A. Goddard III ; Yongchun Tang ; Patrick Shuler ; Mario Blanco ; Seung Soon Jang ; Shiang-Tai Lin ; Prabal Maiti ; Yongfu Wu ; Stefan Iglauer ; Xiaohang Zhang.

* cited by examiner

COMPOSITIONS AND METHODS FOR GAS WELL TREATMENT

RELATED APPLICATION

The present application is a continuation of and claims the benefit to U.S. patent application Ser. No. 12/029,335, filed 11 Feb. 2008.

BACKGROUND OF THE INVENTION

1. Field of the Invention

The present invention relates to a new microemulsion system for rapid cleanup and enhanced production of hydrocarbon-containing fluids in fractured tight subterranean formations and to methods for making and using same.

More particularly, the present invention relates to a new microemulsion system for rapid clean up and enhanced production of hydrocarbon-containing fluids in fractured tight subterranean formations, where the microemulsion system includes a surfactant subsystem including one monoalkyl branched propoxy sulfate or a plurality of monoalkyl branched propoxy sulfates, a solvent subsystem and a co-solvent subsystem and to methods for making and using same.

2. Description of the Related Art

Historically the use of microemulsion systems for water block cleaning purposes and enhanced gas production purposes date back to at least 1992.

For example, U.S. Pat. No. 5,310,002 disclosed formulations based on microemulsions, where the microemulsion includes (i) an alkyl alcohol having in the range of from 4 to 18 carbon atoms microemulsified into the treatment fluid; (ii) a microemulsifying agent present in an amount sufficient to form and maintain a stable microemulsified dispersion of the alkyl alcohol in the treatment fluid; (iii) a microemulsion mutual solvent selected from the group consisting of glycol ethers and alkyoxylates of glycol ethers; and (iv) a microemulsion co-solvent selected from the group consisting of polyethylene glycol, primary alcohols and alkyoxylates of alkyl alcohols.

U.S. Pat. No. 6,911,417 disclosed a formulation, and method for removing water from a near-wellbore portion of a subterranean formation containing a crude oil and penetrated by a wellbore surfactant systems, where the formulation includes alkylpolyglycoside, ethoxylated alcohols and linear alkyl alcohol or the formulation includes a hydrocarbonaceous liquid, alkylpolyglycoside, ethoxylated alcohol and linear alkyl alcohol.

United States Published Pat. Appln. No. 20030166472 disclosed a microemulsion well treatment microemulsion that is formed by combining a solvent-surfactant blend with a carrier fluid. In preferred embodiments, the solvent-surfactant blend includes a surfactant and a solvent selected from the group consisting of terpenes and alkyl or aryl esters of short chain alcohols.

In many instances, when wellbores are drilled to penetrate a subterranean oil-bearing formation, it is found that upon completion of the wellbores, whether using an oil-based drilling mud, water-based drilling mud or water-based drill-in-fluids, the near-wellbore portion of the formation frequently retains quantities of water greater than the in-situ or natural water saturation levels of the formation. The in-situ water saturation levels are typically nearly, if not the same, as the connate water saturation levels although in some formations the in-situ water saturation levels may be substantially greater or less than the connate water saturation level for the formation.

As used herein, the term "connate water saturation" or "irreducible water saturation" refers to the minimum water saturation in a subterranean oil-bearing formation that can be achieved by flushing with oil, thereby increasing the oil saturation and the flowing fraction of the oil phase. This can be ascertained or determined in a formation core that has been cleaned, dried and fully water saturated and thereafter flooded with oil. The water remaining after the oil flush is nearly equal or equal to the connate water saturation level and cannot be reduced further by oil flushing or oil contact. The term "in-situ water saturation" refers to the pre-existing formation water saturation level prior to drilling or oil production.

Formations drilled for the production of crude oil are naturally-occurring formations, which as well known to the art, underlie overburden formations and may be above other oil-bearing or non-oil-bearing formations beneath the formation of interest. When such formations are drilled, it is known that they typically have at least an in-situ saturation, which is most commonly the connate (residual saturation) water content. This water content is the inherent water saturation level in the formation and may be increased by the invasion of water-based drilling fluid filtrate components. Typically, the presence of water in excess of the in-situ water saturation level in the formation inhibits the production of crude oil from the formation.

In some formations, it has been noted that the formation has an in-situ water saturation level lower than the connate water saturation level, i.e., the formation actually imbibes water during drilling so that the formation as drilled may retain water up to or beyond the connate water saturation level. In such formations, the imbibed water up to the connate water saturation level is not typically removed by the production of crude oil. The water is only reduced back to the connate water saturation level for the formation through natural mechanisms. The presence of water above the in-situ water saturation level can and does typically inhibit the production of crude oil from the formation.

Previously, attempts to reduce water in the near-wellbore portion of the formation either back to the connate level or below have involved the use of materials such as a mixture of methanol and water or the like, in attempts to remove the water with aqueous solutions that are at least partially soluble in the crude oil. The use of such approaches, while they may have had limited success in some instances, are generally less than completely successful and are less desirable because of the safety concerns on the use of highly flammable methanol solvent.

Various applications wherein alkylpolyglycosides in combination with ethoxylated alcohols, alcohols and the like have been used in aqueous formations are shown in U.S. Pat. No. 4,985,154 issued Jan. 15, 1991 to Balzer, et al; U.S. Pat. No. 5,725,470 issued Mar. 10, 1998 to Lazarowitz, et al; U.S. Pat. No. 5,830,831 issued Nov. 3, 1998 to Chan, et al; U.S. Pat. No. 5,874,386 issued Feb. 23, 1999 to Chan, et al; U.S. Pat. No. 5,977,032 issued Nov. 2, 1999 to Chan; U.S. Pat. No. 6,000,412 issued Dec. 14, 1999 to Chan, et al; U.S. Pat. No. 6,090,754 issued Jul. 18, 2000 to Chan, et al; and U.S. Pat. No. 6,112,814 issued Sep. 5, 2000 to Chan, et al. These patents are hereby incorporated by reference.

In other instances, it has been found that water occasionally tends to accumulate to levels above the connate water saturation level in the near-wellbore area during production of oil from the well. As the water accumulates, it successively reduces the flowing fraction of the oil phase, and therefore the production of oil from the formation. This water becomes trapped in the pore structure of the formation and remains in place and does not move with the flow of crude oil from the formation.

Although numerous microemulsion systems have been produced for use in the oil and gas industry, there is still a need the art for other microemulsion systems for use in the oil and gas industry or in related industries.

DEFINITIONS OF THE INVENTION

The following definitions are provided in order to aid those skilled in the art in understanding the detailed description of the present invention.

The term "surfactant" refers to a soluble, or partially soluble compound that reduces the surface tension of liquids, or reduces inter-facial tension between two liquids, or a liquid and a solid by congregating and orienting itself at these interfaces.

The term "amphoteric" refers to surfactants that have both positive and negative charges. The net charge of the surfactant can be positive, negative, or neutral, depending on the pH of the solution.

The term "anionic" refers to those surfactants that possess a net negative charge.

The term "cationic" refers to those surfactants that possess a net positive charge.

The term "fracturing" refers to the process and methods of breaking down a geological formation, i.e. the rock formation around a well bore, by pumping fluid at very high pressures, in order to increase production rates from a hydrocarbon reservoir. The fracturing methods of this invention use otherwise conventional techniques known in the art.

The term "proppant" refers to a granular substance suspended in the fracturing fluid during the fracturing operation, which serves to keep the formation from closing back down upon itself once the pressure is released. Proppants envisioned by the present invention include, but are not limited to, conventional proppants familiar to those skilled in the art such as sand, 20-40 mesh sand, resin-coated sand, sintered bauxite, glass beads, and similar materials.

The term "HLB value" means the hydrophil/lipophilic (hydro-phobe) balance. This value then is an indication of the oil or water solubility of the product. The lower the HLB number the more oil soluble the product; and in turn the higher the HLB number the more water-soluble the product is. Below is a formula of how HLB values are calculated:

$$\frac{Mol.\ wt.\ EO \times moles\ EO}{Mol.\ wt.\ ofAdduct} \times 0.20 = HLB$$

SUMMARY OF THE INVENTION

Well Treatment Formulations

The present invention provides a well treatment microemulsion system including a solvent(s)-co-solvent(s)-surfactant blend.

The present invention provides a well treatment microemulsion system including a surfactant subsystem, a solvent subsystem, and a co-solvent subsystem.

The present invention provides a well treatment microemulsion system including a surfactant subsystem, a solvent subsystem, and a co-solvent subsystem, where the surfactant subsystem includes one monoalkyl branched propoxy sulfate or a plurality of monoalkyl branched propoxy sulfates.

In certain embodiments, the present invention provides a microemulsion system including (a) a surfactant subsystem including at least one monoalkyl branched propoxy sulfate anionic surfactant, (b) a solvent subsystem including an organic solvent and water, and (c) a co-solvent subsystem including a mixture of alcohols and at least one polypropylene glycol. The surfactant subsystem can also include at least one ethoxylated alcohol and at least one ethylene oxide/propylene oxide block copolymer having an HLB value between about 7 and about 15. The surfactant subsystem can further include at least one alkyl ether sulfate anionic surfactant. In certain embodiments, the mixture of alcohols includes at least one short chain alcohol having between about 1 and about 4 carbon atoms and at least one longer chain alcohol having between about 6 and about 10 carbon atoms. In other embodiments, the mixture of alcohols includes at least one short chain alcohol having between about 2 and about 4 carbon atoms and at least one longer chain alcohol having between about 7 and about 9 carbon atoms. In other embodiments, the mixture of alcohols includes isopropyl alcohol and 1-octanol. In certain embodiments, the organic solvent includes benzene, an alkarene or a mixture thereof. Exemplary examples of alkarenes include toluene, xylenes, ethylbenzene, or mixtures of combinations thereof. In other embodiments, the organic solvent includes a terpene or a mixture of terpenes. In other embodiments, the organic solvent is d-limonene or dipentene.

The present invention provides a well treatment microemulsion system including a surfactant subsystem, a solvent subsystem, and a co-solvent subsystem. The surfactant subsystem includes (a) a monoalkyl branched propoxy sulfate or a plurality of monoalkyl branched propoxy sulfates, (b) at least one low foam generating ethoxylated alcohol, and (c) at least one low foam generating block copolymer or plurality of block copolymers of ethylene oxide and propylene oxide having an HLB value between about 7 and about 15. The surfactant subsystem can also include other anionic surfactants such as sodium alkyl ether sulfates. The co-solvent subsystem includes (a) at least one low molecular weight alcohol, (b) at least one higher molecular weight alcohol, and (c) at least one polypropylene glycol. The solvent subsystem includes (a) terpene or a plurality of terpenes and (b) water.

The present invention provides a well treatment microemulsion system including a surfactant subsystem, a solvent subsystem, and a co-solvent subsystem. The surfactant subsystem includes (a) between about 0.1 weight percent and about 10 weight percent of monoalkyl branched propoxy sulfate or a plurality of monoalkyl branched propoxy sulfates, (b) between about 0.1 weight percent and about 30 weight percent of a low foam generating ethoxylated alcohol comprising a narrow ranged reaction product of an alcohol having between about 8 and about 10 carbon atoms and an average of about 7 ethylene oxide groups per alcohol molecule and (c) between about 0.1 weight percent and about 30 weight percent of a low foam generating block copolymer or plurality of block copolymers of ethylene oxide and propylene oxide having a HLB value between about 7 and 15. The co-solvent subsystem includes (a) between about 0.1 weight percent and about 20 weight percent of isopropyl alcohol (IPA), (b) between about 0.1 weight percent and about 5 weight percent of 1-octanol, and (c) between about 0.1 weight percent and about 15 weight percent of a polypropylene glycol. The solvent subsystem includes between about 2 weight percent and about 25 weight percent of (a) terpene or a plurality of terpenes such as d-limonene or dipentene and (b) between about 20 weight percent and about 75 weight percent of water.

Methods for Using the Treating Methods

Well Treatments

The present invention provides a method for removing bound water from gas and/or oil bearing subterranean formations, where the method includes the step of injecting into a formation an effective amount of a well treatment microemulsion system of this invention, the effective amount being sufficient to remove water blocks and to enhance formation production. The method also includes the step of maintaining the mixture in the formation for a time from about 2 to about 96 hours. The method also includes the step of producing fluids from the formation including the well treatment microemulsion system.

Fracturing

The present invention provides a method for fracturing a formation including the steps of pumping a fracturing fluid and then a proppant-containing fluid into a producing formation at a pressure sufficient to fracture the formation and to enhance productivity, where the fluid includes a microemulsion of this invention and where the proppant props open the formation after fracturing. The present invention also provides a method for fracturing a formation including the step of pumping a fracturing fluid including a proppant and a microemulsion of this invention into a producing formation at a pressure sufficient to fracture the formation and to enhance productivity, where the proppant props open the formation after fracturing. The present invention also provides a method for fracturing a formation including the steps of pumping a fracturing fluid including a proppant into a producing formation at a pressure sufficient to fracture the formation and to enhance productivity, where the proppant props open the formation after fracturing and then pumping a well treatment of this invention into the fractured/propped formation for rapid clean up and enhanced production of hydrocarbon-containing fluids.

Producing

The present invention also provides a method for producing including the step of circulating and/or pumping a fluid into a well on production, where the fluid includes a composition of this invention for rapid clean up and enhanced production of hydrocarbon-containing fluids.

Drilling

The present invention also provides a method for drilling including the step of circulating and/or pumping a fluid into a well during drilling operations, where the fluid includes a composition of this invention for rapid clean up and enhanced flow hydrocarbon-containing fluids into the drilling fluid to evidence the penetration into a producing formation.

BRIEF DESCRIPTION OF THE DRAWINGS

The invention can be better understood with reference to the following detailed description together with the appended illustrative drawings in which like elements are numbered the same.

DETAILED DESCRIPTION OF THE INVENTION

Figure 1:
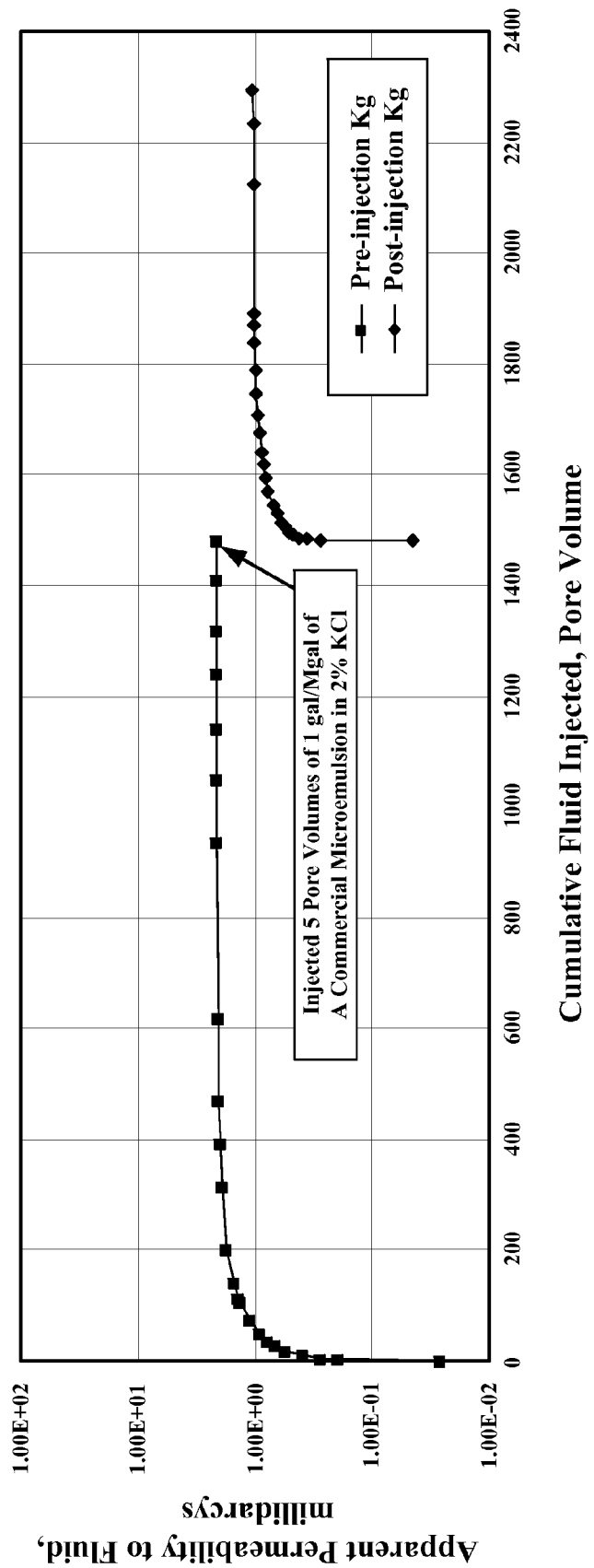
FIG. 1 depicts a plot of apparent permeability to nitrogen in millidarcys versus cumulative fluid injected, before and after treating with 1 gal/Mgal of conventional microemulsion system in berea Sandstone @ 140 F. Permeability to air 8-10 millidarcys.

The inventors have found that new thermodynamically stable, microemulsion systems including a surfactant subsystem, a solvent subsystem and water, where the systems are substantially optically isotropic and are capable of increasing gas and/or gas and oil production and water recovery. The inventors have found that the new microemulsion systems and uses thereof afford rapid clean up and enhanced production in fractured tight gas subterranean formations with low foam generation. The inventors have found that by including one monoalkyl branched propoxy sulfate or a plurality of monoalkyl branched propoxy sulfates in the surfactant subsystem of a microemulsion system enhances the performance characteristics of the microemulsion system.

In certain embodiments, the new thermodynamically stable, microemulsion systems include a nonionic surfactant or a plurality of nonionic surfactants, an anionic surfactant or a plurality of anionic surfactants, a co-solvent subsystem and a solvent system including terpenes and water, where anionic surfactant or surfactants includes one monoalkyl branched propoxy sulfate or a plurality of monoalkyl branched propoxy sulfates.

The microemulsion systems of this invention are adapted to be added to fracturing fluids for low permeability formations in concentrations between about 1 gal/Mgal (gallons per thousand gallons) and about 5 gal/Mgal. At this concentration range, the systems improves removal of water block (speeds up the removal of water blocks) thereby improving gas production. Most of the commercially available microemulsion systems for this applications have been formulated with only non-ionic surfactants having a cloud point for either the mother solution or the treating solution of only 150° F. or lower. Another problem related to the current systems is that they are extremely expensive.

Microemulsion Compositions

The present invention broadly relates to microemulsion formulations or compositions including a surfactant subsystem, a solvent subsystem and co-solvent subsystem, where the surfactant subsystem includes one monoalkyl branched propoxy sulfate or a plurality of monoalkyl branched propoxy sulfates.

In certain embodiments, the present invention relates to a microemulsion system including (a) a surfactant subsystem including at least one monoalkyl branched propoxy sulfate anionic surfactant, (b) a solvent subsystem including an organic solvent and water, and (c) a co-solvent subsystem including a mixture of alcohols and at least one polypropylene glycol. The surfactant subsystem can also include at least one ethoxylated alcohol and at least one ethylene oxide/propylene oxide block copolymer having an HLB value between about 7 and about 15. The surfactant subsystem can further include at least one alkyl ether sulfate anionic surfactant. In certain embodiments, the mixture of alcohols includes at least one short chain alcohol having between about 1 and about 4 carbon atoms and at least one longer chain alcohol having between about 6 and about 10 carbon atoms. In other embodiments, the mixture of alcohols includes at least one short chain alcohol having between about 2 and about 4 carbon atoms and at least one longer chain alcohol having between about 7 and about 9 carbon atoms. In other embodiments, the mixture of alcohols includes isopropyl alcohol and 1-octanol. In certain embodiments, the organic solvent includes benzene, an alkarene or a mixture thereof. Exemplary examples of alkarenes include toluene, xylenes, ethylbenzene, or mixtures of combinations thereof. In other embodiments, the organic solvent includes a terpene or a mixture of terpenes. In other embodiments, the organic solvent is d-limonene or dipentene.

In certain embodiments of the microemulsion system of this invention, the solvent subsystem includes:
  from about 5 wt. % to about 75% wt. % water, and
  from about 0.1 wt % to about 50 wt % of a terpene or plurality of terpenes.

In certain embodiments of the microemulsion system of this invention, the solvent subsystem includes:
  from about 20 wt. % to about 75% wt. % water, and
  from about 2 wt % to about 25 wt % of a terpene or a mixture of terpenes.

In certain embodiments of the microemulsion system of this invention, the surfactant subsystem includes:
  from 0.1 wt % to about 30% wt % of at least one ethoxylated alcohol obtained of a narrow range catalyst technology containing from about 8 to about 10 carbon chain length alkyls with an average of about 7 ethylene oxide groups per mole
  from 0.1 wt % to about 30 wt % at least one block copolymer of ethylene oxide and propylene oxide having a HLB value between about 7 and about 15,
  from 0.1 wt. % to about 10 wt. % of at least one monoalkyl branched propoxy sulfate, and
  from 0.1 wt % to about 10 wt % of sodium tridecyl ether sulfate.

In certain embodiments of the microemulsion system of this invention, the co-solvent system includes:
  from about 0.1 wt. % to about 20 wt. % at least one short chain linear alcohol,
  from about 0.1 wt. % to about 15 wt. % at least one longer chain linear alcohol, and
  from about 0.1 wt. % to about 15 wt. % at least one polypropylene glycol.

In certain embodiments of the microemulsion system of this invention, the co-solvent system includes:
  from about 0.1 wt. % to about 15 wt. % at least one short chain linear alcohol,
  from about 0.5 wt. % to about 15 wt. % at least one longer chain linear alcohol, and
  from about 0.5 wt. % to about 15 wt. % at least one polypropylene glycol.

In certain embodiments, the microemulsion system of this invention includes:
  a surfactant subsystem including:
    from about 0.5 wt. % to about 30 wt. % at least one ethoxylated alcohol comprising a reaction product of a $C_{12}$-$C_{16}$ alcohol and six (6) to eight (8) ethylene oxide (EO) units,
    from about 0.5 wt. % to about 30 wt. % at least one ethylene oxide (EO)/propylene oxide (PO) copolymer having a HLB value between about 7 and about 15,
    from about 0.1 wt. % to about 10 wt. % at least one monoalkyl branched propoxy sulfate,
  a co-solvent system including:
    from about 0.1 wt. % to about 15 wt. % at least one short chain linear alcohol,
    from about 0.5 wt. % to about 10 wt. % at least one longer chain linear alcohol,
    from about 0.5 wt. % to about 15 wt. % at least one short polypropylene glycol, and
  a solvent system including:
    from about 1 wt. % to about 50 wt. % of at least one terpene, and
    from about 20 wt. % to about 75 wt. % of water.

In other embodiments, the microemulsion system of this invention includes:
  a surfactant subsystem including:
    from about 1 wt. % to about 30 wt. % at least one ethoxylated alcohol comprising a reaction product of a $C_{12}$-$C_{16}$ alcohol and six (6) to eight (8) ethylene oxide (EO) units,
    from about 1 wt. % to about 30 wt. % at least one ethylene oxide (EO)/propylene oxide (PO) copolymer having a HLB value between about 7 and about 15,
    from about 1 wt. % to about 10 wt. % at least one monoalkyl branched propoxy sulfate,
  a co-solvent system including:
    from about 1 wt. % to about 15 wt. % at least one short chain linear alcohol,
    from about 1 wt. % to about 10 wt. % at least one longer chain linear alcohol,
    from about 1 wt. % to about 15 wt. % at least one polypropylene glycol,
  a solvent system including:
    from about 1 wt. % to about 25 wt. % of a first terpene,
    from about 1 wt. % to about 25 wt. % of a second terpene, and
    from about 20 wt. % to about 75 wt. % water.

In other embodiments, the microemulsion system of this invention includes:
  a surfactant subsystem including:
    from about 2 wt. % to about 30 wt. % at least one ethoxylated alcohol comprising a reaction product of a $C_{12}$-$C_{16}$ alcohol and six (6) to eight (8) ethylene oxide (EO) units,
    from about 2 wt. % to about 30 wt. % at least one ethylene oxide (EO)/propylene oxide (PO) copolymer having a HLB value between about 7 and about 15,
    from about 2 wt. % to about 10 wt. % at least one $C_{15}$-$C_{17}$ monoalkyl branched propoxy sulfate,
  a co-solvent system including:
    from about 0.1 wt. % to about 15 wt. % of isopropyl alcohol (IPA),
    from about 0.5 wt. % to about 10 wt. % of 1-octanol,
    from about 0.5 wt. % to about 15 wt. % at least one polypropylene glycol, and
  a solvent system including:
    from about 0.1 wt. % to about 25 wt. % of d-limonene,
    from about 0.1 wt. % to about 25 wt. % of dipentene, and
    from about 20 wt. % to about 75 wt. % water.

In the discussion of the present invention, reference is made to bound water to refer to imbibed water, water above the connate saturation level, water accumulated and retained in the near-wellbore region around the well, and the like.

All the formulations of this invention are designed to have low foam generation when added to the treating fluids.

The compositions of this invention including a microemulsion for removing water positioned in a formation, producing a very low surface tension microemulsion system. The low surface tension with the excess water phase allows the trapped water to be mobilized and displaced out of the formation.

The mixture is injected into a subterranean formation by simply injecting it into a well or wellbore in the zone of interest of the formation and thereafter pressurizing it into the formation for the selected distance. Methods for achieving the placement of a selected quantity of a mixture in a subterranean formation are well known, as will be discussed hereinafter.

After treatment of the formation for a selected period of time, which is typically from about 2 to about 96 hours, and preferably from about 16 to about 24 hours, the mixture is removed from the near-wellbore portion of the subterranean formation. This removal may conveniently be accomplished by simply producing the well. The compositions of this invention are recovered from the near-wellbore portion of the formation and produced along with crude oil.

It has been found that the use of this composition has been effective to remove water from the near-wellbore portions of subterranean formations down to, and in some instances below, the connate water saturation level of the formation. As a result increased gas and oil production has been achieved.

Method for Treating

The present invention also relates to a method for removing bound water from oil and/or gas bearing subterranean formations. The method includes the step of injecting into a formation an effective amount of a microemulsion system. The system comprises a surfactant subsystem including at least one monoalkyl branched propoxy sulfate anionic surfactant, a solvent subsystem including an organic solvent and water, and a co-solvent subsystem including a mixture of alcohols and at least one polypropylene glycol. The effective amount being sufficient to remove water blocks and to enhance formation production. The method can also include the step of maintaining the system in the formation for a time from about 8 to about 96 hours. The method can also include the step of producing fluids from the formation including the microemulsion system. The effective amount also being sufficient to treat accessible portions of the formation and to treat portions extending radially outwardly from the accessible portions to a distance of about 6 inches to about 3 feet. The method can also include the step of maintaining the mixture in the accessible portions for a time from about 8 to about 96 hours.

Method for Fracturing and/or Propping

The present invention broadly relates to methods for fracturing a formation including the step of pumping a fracturing fluid including a composition of this invention into a producing formation at a pressure sufficient to fracture the formation.

The present invention also relates to a method for fracturing a formation comprising the step of pumping, into a producing formation at a pressure sufficient to fracture the formation and to enhance productivity. The fracturing fluid comprises a proppant and a microemulsion system including a surfactant subsystem including at least one monoalkyl branched propoxy sulfate anionic surfactant, a solvent subsystem including an organic solvent and water, and a co-solvent subsystem including a mixture of alcohols and at least one polypropylene glycol. The proppant props is adapted to open the formation after fracturing, and the microemulsion system is adapted to reduce water blocks and water blocking in the formation.

The present invention also relates to a method for fracturing a formation including the step of pumping a fracturing fluid including into a producing formation at a pressure sufficient to fracture the formation and to enhance productivity. The method can also include the step of pumping in a proppant fluid including a proppant and a micro emulsion system comprising a surfactant sub system including at least one monoalkyl branched propoxy sulfate anionic surfactant, a solvent subsystem including an organic solvent and water, and a co-solvent subsystem including a mixture of alcohols and at least one polypropylene glycol. The proppant props open the formation after fracturing, and the microemulsion system reduces water blocks and water blocking in the formation.

The present invention also relates to a method for fracturing a formation including the step of pumping a fracturing fluid into a producing formation at a pressure sufficient to fracture the formation and to enhance productivity. The method also includes the step of pumping in a proppant fluid including a proppant, where the proppant props open the formation after fracturing. The method also includes the step pumping a microemulsion system comprising a surfactant subsystem including at least one monoalkyl branched propoxy sulfate anionic surfactant, a solvent subsystem including an organic solvent and water, and a co-solvent subsystem including a mixture of alcohols and at least one polypropylene glycol, where microemulsion system reduces water blocks and water blocking in the formation.

Method for Producing

The present invention also broadly relates to a method for producing including the step of circulating and/or pumping a fluid into a formation, where the fluid includes a composition of this invention and the composition of this invention is designed to reduce, remove or prevent water block formation during production.

The present invention also relates to a method for producing comprising circulating and/or pumping into a well on production a fluid including a microemulsion system comprising a surfactant subsystem including at least one monoalkyl branched propoxy sulfate anionic surfactant, a solvent subsystem including an organic solvent and water, and a co-solvent subsystem including a mixture of alcohols and at least one polypropylene glycol. The microemulsion system reduces water blocks and water blocking in the formation.

Methods for Drilling

The present invention also broadly relates to a method for drilling including the step of circulating and/or pumping a fluid into a well during drilling operations, where the fluid includes a composition of this invention for rapid clean up, reduced water block formation and enhanced flow hydrocarbon-containing fluids into the drilling fluid to evidence the penetration into a producing formation.

The present invention also relates to a method for drilling comprising the step of circulating and/or pumping into a well during drilling a fluid including a microemulsion system comprising a surfactant subsystem including at least one monoalkyl branched propoxy sulfate anionic surfactant, a solvent subsystem including an organic solvent and water, and a co-solvent subsystem including a mixture of alcohols and at least one polypropylene glycol. The microemulsion system reduces fines and debris in the borehole during drilling.

Suitable Reagents

Suitable ethoxylated alcohols include, without limitation, ethoxylated alcohols prepared from an alcohol having between about eight (8) and about ten (10) carbon atoms and between about six (5) and about eight (8) ethylene oxide (EO) residues, or mixtures thereof. In certain embodiments, the ethoxylated alcohols comprise a narrow ranged reaction product of an alcohol having between about 8 and about 10 carbon atoms and an average of about 7 ethylene oxide groups per alcohol molecule or mixtures thereof.

Suitable short chained alcohols include, without limitation, short chain alcohols having between about one (1) and about six (6) carbon atoms, or mixtures thereof. Exemplary examples include, without limitation, methanol, ethanol, propanol, isopropanol (isopropyl alcohol), n-butanol, iso-butanol, n-pentanol, n-hexanol, cyclohexanol, iso-hexanol, t-butanol, butanol, 2-ethyl-hexanol or other short chained alcohols having one to six carbon atoms, where one or more of the hydrogen atoms can be a halogen atom, or mixtures thereof. The short chained alcohols of the solvent-surfactant blend are thought to stabilize the microemulsion. In addition, the short chained alcohol lower the freezing point of the well treatment microemulsion. In certain embodiment, the short chained alcohol is isopropanol or isopropyl alcohol (IPA).

Suitable long chain alcohols include, without limitation, alcohols having between about eight (8) and about twelve (12) carbon atoms. Exemplary examples include 1-octanol, 1-nonanol, 1-decanol, 1-undecanol, 1-dodecanol, or mixtures thereof, where one or more of the hydrogen atoms can be a halogen atom, or mixtures thereof. In addition, the long chained alcohol can help into the defomer properties when added the microemulsion to a water base system. In certain embodiment, the longer chained alcohol is 1-octanol.

Suitable terpenes include, without limitations, d-limonene, l-limonene, d,l-limonene, γ-terpinene, α-phellandrene, p-cymene, α-pinene, or mixtures thereof.

New Microemulsion Systems

The new microemulsion containing systems of this invention are differentiated from prior art microemulsion systems via the inclusion in the surfactant subsystem a $C_{11}$-$C_{17}$ mono-branched propoxy alkyl sulfate or mixtures thereof. These anionic propoxlylated surfactants allow an increase of a cloud point of the treating solutions of this invention to a temperature of about 170° F. and decrease of a freezing point temperature to about 5° F.

The microemulsions of this invention can also include other freeze prevention additives such as ethylene glycols (EG), polyethylene glycols (PEG), propylene glycols (PG) and triethylene glycols (TEG).

The microemulsion compositions of this invention can optionally include a salt. The addition of a salt to the microemulsion compositions reduces the amount of water needed as a carrier fluid and also lowers the freezing point of the well treatment microemulsion. Among the salts that may be added for stability and co-solvent substitution, NaCl, KCl, $CaCl_2$, and $MgCl_2$ are presently preferred. Others suitable salts can be formed from K, Na, Br, Cr, Cs and Bi families.

After blending the solvent subsystem, surfactant subsystem and co-solvent subsystem to form the microemulsion composition of this invention, it may be desirable to form a diluted microemulsion composition by adding a diluent before addition to the carrier fluid. In certain embodiments, the diluents include water and water and ethylene glycol, polyethylene glycol, propylene glycol, polypropylene glycol, triethylene glycol (TEG) mixtures. In other embodiments, the diluents are 90% by volume water and 10% by volume triethylene glycol. It will be understood that upon addition of the diluent, the solvent surfactant blend may partially or completely emulsify.

Although the microemulsion compositions of this invention are adapted especially for use in well remediation operations, well stimulation operations, well fracturing operations, water de-blocking, well operations, well acidizing operations, well drilling operations, well production operations, and hydrogen sulfide mitigation applications, it will be understood that the inventive microemulsion compositions of this invention can find use in other applications where microemulsions have applicability. For example, the microemulsion composition of this invention may find application as a composition for cleaning surface equipment and downhole equipment.

During drilling operations, the microemulsion compositions of this invention can be added to drilling fluids and injected into the wellbore through the drill string. The microemulsion compositions are generally effective at removing fines and debris from the wellbore created by the drilling process. The microemulsion compositions of this invention can be tailored to operate in oil or water based drilling fluids. The tailoring includes the ratio of the organic solvent to water in the solvent subsystem of the microemulsion compositions of this invention. By changing the relative organic to water ratio, the microemulsion can be tailored to have a water continuous phase or an organic continuous phase or can be tailored to have initially one continuous phase that will change as the microemulsion encounters a water rich fluid or an organic rich fluid. Moreover, the microemulsion compositions of this invention can be tailored so that the microemulsion rapidly switches from a water-in-oil to an oil-in-water microemulsion.

The well treatment microemulsions can also be used to deliver acids during acidizing operations. Acids commonly used include hydrochloric, acetic, formic, and hydrochloric-hydroflouric acids. In certain embodiments, the selected microemulsion compositions of this invention (dilute or concentrate) is combined with an acidified carrier fluid to prepare a microemulsion suitable for acidizing operations. In certain embodiments, the acidizing fluid includes about 0.2%-5% by volume of the microemulsion compositions of this invention and about 3%-28% by volume of acid. In other embodiments, the acidizing fluid includes about 0.2%-5% of the microemulsion compositions of this invention and about 15% by volume of hydrochloric acid. The concentration of the microemulsion compositions of this invention in gelled fluids lowers the friction created by contact with conduits, thereby facilitating the injection and withdrawal of the well treatment microemulsion.

Fracturing Fluids

Generally, a hydraulic fracturing treatment involves pumping a proppant-free viscous fluid, or pad, usually water with some fluid additives to generate high viscosity, into a well faster than the fluid can escape into the formation so that the pressure rises and the rock breaks, creating artificial fracture and/or enlarging existing fracture. After fracturing the formation, a propping agent, generally a solid material such as sand is added to the fluid to form a slurry that is pumped into the newly formed fractures in the formation to prevent them from closing when the pumping pressure is released. The proppant transport ability of a base fluid depends on the type of viscosifying additives added to the water base.

Water-base fracturing fluids with water-soluble polymers added to make a viscosified solution are widely used in the art of fracturing. Since the late 1950s, more than half of the fracturing treatments are conducted with fluids comprising guar gums, high-molecular weight polysaccharides composed of mannose and galactose sugars, or guar derivatives such as hydropropyl guar (HPG), carboxymethyl guar (CMG). carboxymethylhydropropyl guar (CMHPG). Crosslinking agents based on boron, titanium, zirconium or aluminum complexes are typically used to increase the effective molecular weight of the polymer and make them better suited for use in high-temperature wells.

To a lesser extent, cellulose derivatives such as hydroxyethylcellulose (HEC) or hydroxypropylcellulose (HPC) and carboxymethylhydroxyethylcellulose (CMHEC) are also used, with or without crosslinkers. Xanthan and scleroglucan, two biopolymers, have been shown to have excellent proppant-suspension ability even though they are more expensive than guar derivatives and therefore used less frequently. Polyacrylamide and polyacrylate polymers and copolymers are used typically for high-temperature applications or friction reducers at low concentrations for all temperatures ranges.

Polymer-free, water-base fracturing fluids can be obtained using viscoelastic surfactants. These fluids are normally prepared by mixing in appropriate amounts of suitable surfactants such as anionic, cationic, nonionic and zwitterionic surfactants. The viscosity of viscoelastic surfactant fluids is attributed to the three dimensional structure formed by the components in the fluids. When the concentration of surfactants in a viscoelastic fluid significantly exceeds a critical concentration, and in most cases in the presence of an electrolyte, surfactant molecules aggregate into species such as micelles, which can interact to form a network exhibiting viscous and elastic behavior.

Cationic viscoelastic surfactants—typically consisting of long-chain quaternary ammonium salts such as cetyltrimethylammonium bromide (CTAB)—have been so far of primarily commercial interest in wellbore fluid. Common reagents that generate viscoelasticity in the surfactant solutions are salts such as ammonium chloride, potassium chloride, sodium chloride, sodium salicylate and sodium isocyanate and non-ionic organic molecules such as chloroform. The electrolyte content of surfactant solutions is also an important control on their viscoelastic behavior. Reference is made for example to U.S. Pat. No. 4,695,389, U.S. Pat. No. 4,725,372, U.S. Pat. No. 5,551,516, U.S. Pat. No. 5,964,295, and U.S. Pat. No. 5,979,557. However, fluids comprising this type of cationic viscoelastic surfactants usually tend to lose viscosity at high brine concentration (10 pounds per gallon or more). Therefore, these fluids have seen limited use as gravel-packing fluids or drilling fluids, or in other applications requiring heavy fluids to balance well pressure. Anionic viscoelastic surfactants are also used.

It is also known from International Patent Publication WO 98/56497, to impart viscoelastic properties using amphoteric/zwitterionic surfactants and an organic acid, salt and/or inorganic salt. The surfactants are for instance dihydroxyl alkyl glycinate, alkyl ampho acetate or propionate, alkyl betaine, alkyl amidopropyl betaine and alkylamino mono- or di-propionates derived from certain waxes, fats and oils. The surfactants are used in conjunction with an inorganic water-soluble salt or organic additives such as phthalic acid, salicylic acid or their salts. Amphoteric/zwitterionic surfactants, in particular those comprising a betaine moiety are useful at temperature up to about 150° C. and are therefore of particular interest for medium to high temperature wells. However, like the cationic viscoelastic surfactants mentioned above, they are usually not compatible with high brine concentration.

The proppant type can be sand, intermediate strength ceramic proppants (available from Carbo Ceramics, Norton Proppants, etc.), sintered bauxites and other materials known to the industry. Any of these base propping agents can further be coated with a resin (available from Santrol, a Division of Fairmount Industries, Borden Chemical, etc.) to potentially improve the clustering ability of the proppant. In addition, the proppant can be coated with resin or a proppant flowback control agent such as fibers for instance can be simultaneously pumped. By selecting proppants having a contrast in one of such properties such as density, size and concentrations, different settling rates will be achieved.

"Waterfrac treatments employ the use of low cost, low viscosity fluids in order to stimulate very low permeability reservoirs. The results have been reported to be successful (measured productivity and economics) and rely on the mechanisms of asperity creation (rock spalling), shear displacement of rock and localized high concentration of proppant to create adequate conductivity. It is the last of the three mechanisms that is mostly responsible for the conductivity obtained in "waterfrac" treatments. The mechanism can be described as analogous to a wedge splitting wood.

An aqueous fracturing fluid may be prepared by blending a hydratable polymer with an aqueous base fluid. The base aqueous fluid can be, for example, water or brine. Any suitable mixing apparatus may be used for this procedure. In the case of batch mixing, the hydratable polymer and aqueous fluid are blended for a period of time which is sufficient to form a hydrated sol.

Hydraulic fracturing techniques are widely employed to enhance oil and gas production from subterranean formations. During hydraulic fracturing, fluid is injected into a well bore under high pressure. Once the natural reservoir pressures are exceeded, the fracturing fluid initiates a fracture in the formation which generally continues to grow during pumping. As the fracture widens to a suitable width during the course of the treatment, a propping agent is then also added to the fluid. The treatment design generally requires the fluid to reach a maximum viscosity as it enters the fracture which affects the fracture length and width. The viscosity of most fracturing fluids is generated from water-soluble polysaccharides, such as galactomannans or cellulose derivatives. Employing crosslinking agents, such as borate, titanate, or zirconium ions, can further increase the viscosity. The gelled fluid may be accompanied by a propping agent (i.e., proppant) which results in placement of the proppant within the fracture thus produced. The proppant remains in the produced fracture to prevent the complete closure of the fracture and to form a conductive channel extending from the well bore into the formation being treated once the fracturing fluid is recovered.

In order for the treatment to be successful, it is preferred that the fluid viscosity eventually diminish to levels approaching that of water after the proppant is placed. This allows a portion of the treating fluid to be recovered without producing excessive amounts of proppant after the well is opened and returned to production. The recovery of the fracturing fluid is accomplished by reducing the viscosity of the fluid to a lower value such that it flows naturally from the formation under the influence of formation fluids. This viscosity reduction or conversion is referred to as "breaking" and can be accomplished by incorporating chemical agents, referred to as "breakers," into the initial gel.

Certain gels of fracturing fluids, such as those based upon guar polymers, undergo a natural break without the intervention of a breaking agent. However, the breaking time for such gelled fluids generally is excessive and impractical, being somewhere in the range from greater than 24 hours to in excess of weeks, months, or years depending on reservoir conditions. Accordingly, to decrease the break time of gels used in fracturing, chemical agents are usually incorporated into the gel and become a part of the gel itself. Typically, these agents are either oxidants or enzymes which operate to degrade the polymeric gel structure. Most degradation or "breaking" is caused by oxidizing agents, such as persulfate salts (used either as is or encapsulated), chromous salts, organic peroxides or alkaline earth or zinc peroxide salts, or by enzymes.

In addition to the importance of providing a breaking mechanism for the gelled fluid to facilitate recovery of the fluid and to resume production, the timing of the break is also of great importance. Gels which break prematurely can cause suspended proppant material to settle out of the gel before being introduced a sufficient distance into the produced fracture. Premature breaking can also lead to a premature reduction in the fluid viscosity, resulting in a less than desirable fracture width in the formation causing excessive injection pressures and premature termination of the treatment.

On the other hand, gelled fluids which break too slowly can cause slow recovery of the fracturing fluid from the produced fracture with attendant delay in resuming the production of formation fluids and severely impair anticipated hydrocarbon production. Additional problems may occur, such as the tendency of proppant to become dislodged from the fracture, resulting in at least partial closing and decreased efficiency of the fracturing operation. Preferably, the fracturing gel should begin to break when the pumping operations are concluded. For practical purposes, the gel preferably should be completely broken within about 24 hours after completion of the fracturing treatment. Gels useful in this regard include those disclosed in U.S. Pat. Nos. 3,960,736; 5,224,546; 6,756,345; and 6,793,018, incorporated herein by reference.

Suitable solvents fore use in this invention include, without limitation, water. The solvent may be an aqueous potassium chloride solution.

Suitable inorganic breaking agent include, without limitation, a metal-based oxidizing agent, such as an alkaline earth metal or a transition metal; magnesium peroxide, calcium peroxide, or zinc peroxide.

Suitable ester compound include, without limitation, an ester of a polycarboxylic acid, e.g., an ester of oxalate, citrate, or ethylene diamine tetraacetate. Ester compound having hydroxyl groups can also be acetylated, e.g., acetylated citric acid to form acetyl triethyl citrate.

Suitable hydratable polymers that may be used in embodiments of the invention include any of the hydratable polysaccharides which are capable of forming a gel in the presence of a crosslinking agent. For instance, suitable hydratable polysaccharides include, but are not limited to, galactomannan gums, glucomannan gums, guars, derived guars, and cellulose derivatives. Specific examples are guar gum, guar gum derivatives, locust bean gum, Karaya gum, carboxymethyl cellulose, carboxymethyl hydroxyethyl cellulose, and hydroxyethyl cellulose. Presently preferred gelling agents include, but are not limited to, guar gums, hydroxypropyl guar, carboxymethyl hydroxypropyl guar, carboxymethyl guar, and carboxymethyl hydroxyethyl cellulose. Suitable hydratable polymers may also include synthetic polymers, such as polyvinyl alcohol, polyacrylamides, poly-2-amino-2-methyl propane sulfonic acid, and various other synthetic polymers and copolymers. Other suitable polymers are known to those skilled in the art.

The hydratable polymer may be present in the fluid in concentrations ranging from about 0.10% to about 5.0% by weight of the aqueous fluid. In certain embodiment, a range for the hydratable polymer is about 0.20% to about 0.80% by weight.

A suitable crosslinking agent can be any compound that increases the viscosity of the fluid by chemical crosslinking, physical crosslinking, or any other mechanisms. For example, the gellation of a hydratable polymer can be achieved by crosslinking the polymer with metal ions including boron, zirconium, and titanium containing compounds, or mixtures thereof. One class of suitable crosslinking agents is organotitanates. Another class of suitable crosslinking agents is borates as described, for example, in U.S. Pat. No. 4,514,309. The selection of an appropriate crosslinking agent depends upon the type of treatment to be performed and the hydratable polymer to be used. The amount of the crosslinking agent used also depends upon the well conditions and the type of treatment to be effected, but is generally in the range of from about 10 ppm to about 1000 ppm of metal ion of the crosslinking agent in the hydratable polymer fluid. In some applications, the aqueous polymer solution is crosslinked immediately upon addition of the crosslinking agent to form a highly viscous gel. In other applications, the reaction of the crosslinking agent can be retarded so that viscous gel formation does not occur until the desired time.

The organotitanate constituent can be TYZOR® titanium chelate esters from E.I du Pont de Nemours & Company. The organotitanate constituent can be a mixture of a first organotitanate compound having a lactate base and a second organotitanate compound having triethanolamine base.

The boron constituent can be selected from the group consisting of boric acid, sodium tetraborate, and mixtures thereof. These are described in U.S. Pat. No. 4,514,309.), borate based ores such as ulexite and colemanite, Ti(IV) acetylacetonate, Ti(IV) triethanolamine, Zr lactate, Zr triethanolamine, Zr lactate-triethanolamine, or Zr lactate-triethanolamine-triisopropanolamine. In some embodiments, the well treatment fluid composition may further comprise a proppant.

"Premature breaking" as used herein refers to a phenomenon in which a gel viscosity becomes diminished to an undesirable extent before all of the fluid is introduced into the formation to be fractured. Thus, to be satisfactory, the gel viscosity should preferably remain in the range from about 50% to about 75% of the initial viscosity of the gel for at least two hours of exposure to the expected operating temperature. Preferably the fluid should have a viscosity in excess of 100 centipoise (cP) at 100 sec$^{-1}$ while injection into the reservoir as measured on a Fann 50 C viscometer in the laboratory.

"Complete breaking" as used herein refers to a phenomenon in which the viscosity of a gel is reduced to such a level that the gel can be flushed from the formation by the flowing formation fluids or that it can be recovered by a swabbing operation. In laboratory settings, a completely broken, non-crosslinked gel is one whose viscosity is about 10 cP or less as measured on a Model 35 Fann viscometer having a R1B1 rotor and bob assembly rotating at 300 rpm.

The pH of an aqueous fluid which contains a hydratable polymer can be adjusted if necessary to render the fluid compatible with a crosslinking agent. Preferably, a pH adjusting material is added to the aqueous fluid after the addition of the polymer to the aqueous fluid. Typical materials for adjusting the pH are commonly used acids, acid buffers, and mixtures of acids and bases. For example, sodium bicarbonate, potassium carbonate, sodium hydroxide, potassium hydroxide, and sodium carbonate are typical pH adjusting agents. Acceptable pH values for the fluid may range from neutral to basic, i.e., from about 5 to about 14. Preferably, the pH is kept neutral or basic, i.e., from about 7 to about 14, more preferably between about 8 to about 12.

The term "breaking agent" or "breaker" refers to any chemical that is capable of reducing the viscosity of a gelled fluid. As described above, after a fracturing fluid is formed and pumped into a subterranean formation, it is generally desirable to convert the highly viscous gel to a lower viscosity fluid. This allows the fluid to be easily and effectively removed from the formation and to allow desired material, such as oil or gas, to flow into the well bore. This reduction in viscosity of the treating fluid is commonly referred to as "breaking". Consequently, the chemicals used to break the viscosity of the fluid is referred to as a breaking agent or a breaker.

There are various methods available for breaking a fracturing fluid or a treating fluid. Typically, fluids break after the passage of time and/or prolonged exposure to high temperatures. However, it is desirable to be able to predict and control the breaking within relatively narrow limits. Mild oxidizing agents are useful as breakers when a fluid is used in a relatively high temperature formation, although formation temperatures of 300° F. (149° C.) or higher will generally break the fluid relatively quickly without the aid of an oxidizing agent.

Examples of inorganic breaking agents for use in this invention include, but are not limited to, persulfates, percarbonates, perborates, peroxides, perphosphates, permanganates, etc. Specific examples of inorganic breaking agents include, but are not limited to, alkaline earth metal persulfates, alkaline earth metal percarbonates, alkaline earth metal perborates, alkaline earth metal peroxides, alkaline earth metal perphosphates, zinc salts of peroxide, perphosphate, perborate, and percarbonate, and so on. Additional suitable breaking agents are disclosed in U.S. Pat. Nos. 5,877,127; 5,649,596; 5,669,447; 5,624,886; 5,106,518; 6,162,766; and 5,807,812. In some embodiments, an inorganic breaking agent is selected from alkaline earth metal or transition metal-based oxidizing agents, such as magnesium peroxides, zinc peroxides, and calcium peroxides.

In addition, enzymatic breakers may also be used in place of or in addition to a non-enzymatic breaker. Examples of suitable enzymatic breakers such as guar specific enzymes, alpha and beta amylases, amyloglucosidase, aligoglucosidase, invertase, maltase, cellulase, and hemi-cellulase are disclosed in U.S. Pat. Nos. 5,806,597 and 5,067,566.

A breaking agent or breaker may be used "as is" or be encapsulated and activated by a variety of mechanisms including crushing by formation closure or dissolution by formation fluids. Such techniques are disclosed, for example, in U.S. Pat. Nos. 4,506,734; 4,741,401; 5,110,486; and 3,163,219.

Generally, the temperature and the pH of a fracturing fluid affects the rate of hydrolysis of an ester. For downhole operations, the bottom hole static temperature ("BHST") cannot be easily controlled or changed. The pH of a fracturing fluid usually is adjusted to a level to assure proper fluid performance during the fracturing treatment. Therefore, the rate of hydrolysis of an ester could not be easily changed by altering BHST or the pH of a fracturing fluid. However, the rate of hydrolysis may be controlled by the amount of an ester used in a fracturing fluid. For higher temperature applications, the hydrolysis of an ester may be retarded or delayed by dissolving the ester in a hydrocarbon solvent. Moreover, the delay time may be adjusted by selecting esters that provide more or less water solubility. For example, for low temperature applications, polycarboxylic esters made from low molecular weight alcohols, such as methanol or ethanol, are recommended. The application temperature range for these esters could range from about 120° F. to about 250° F. (about 49° C. to about 121° C.). On the other hand, for higher temperature applications or longer injection times, esters made from higher molecular weight alcohols should preferably be used. The higher molecular weight alcohols include, but are not limited to, $C_3$-$C_6$ alcohols, e.g., n-propanol, hexanol, and cyclohexanol.

Propping agents or proppants are typically added to the fracturing fluid prior to the addition of a crosslinking agent. However, proppants may be introduced in any manner which achieves the desired result. Any proppant may be used in embodiments of the invention. Examples of suitable proppants include, but are not limited to, quartz sand grains, glass and ceramic beads, walnut shell fragments, aluminum pellets, nylon pellets, and the like. Proppants are typically used in concentrations between about 1 to 8 lbs. per gallon of a fracturing fluid, although higher or lower concentrations may also be used as desired. The fracturing fluid may also contain other additives, such as surfactants, corrosion inhibitors, mutual solvents, stabilizers, paraffin inhibitors, tracers to monitor fluid flow back, and so on.

The well treatment fluid composition in accordance with embodiments of the invention has many useful applications. For example, it may be used in hydraulic fracturing, gravel packing operations, water blocking, temporary plugs for purposes of wellbore isolation and/or fluid loss control, and other well completion operations. One application of the fluid composition is to use it as a fracturing fluid. Accordingly, embodiments of the invention also provide a method of treating a subterranean formation. The method includes formulating a fracturing fluid comprising an aqueous fluid, a hydratable polymer, a crosslinking agent, an inorganic breaking agent, and an ester compound; and injecting the fracturing fluid into a bore hole to contact at least a part of the formation by the fracturing fluid under a sufficient pressure to fracture the formation. Initially, the viscosity of the fracturing fluid should be maintained above at least 200 cP at 40 $\sec^{-1}$ during injection and, afterwards, should be reduced to less than 200 cP at 40 $\sec^{-1}$. After the viscosity of the fracturing fluid is lowered to an acceptable level, at least a portion of the fracturing fluid is removed from the formation. During the fracturing process, a proppant can be injected into the formation simultaneously with the fracturing fluid. Preferably, the fracturing fluid has a pH around or above about 7, more preferably in the range of about 8 to about 12.

It should be understood that the above-described method is only one way to carry out embodiments of the invention. The following U.S. patents disclose various techniques for conducting hydraulic fracturing which may be employed in embodiments of the invention with or without modifications: U.S. Pat. Nos. 6,169,058; 6,135,205; 6,123,394; 6,016,871; 5,755,286; 5,722,490; 5,711,396; 5,551,516; 5,497,831; 5,488,083; 5,482,116; 5,472,049; 5,411,091; 5,402,846; 5,392,195; 5,363,919; 5,228,510; 5,074,359; 5,024,276; 5,005,645; 4,938,286; 4,926,940; 4,892,147; 4,869,322; 4,852,650; 4,848,468; 4,846,277; 4,830,106; 4,817,717; 4,779,680; 4,479,041; 4,739,834; 4,724,905; 4,718,490; 4,714,115; 4,705,113; 4,660,643; 4,657,081; 4,623,021; 4,549,608; 4,541,935; 4,378,845; 4,067,389; 4,007,792; 3,965,982; and 3,933,205.

The liquid carrier can generally be any liquid carrier suitable for use in oil and gas producing wells. A presently preferred liquid carrier is water. The liquid carrier can comprise water, can consist essentially of water, or can consist of water. Water will typically be a major component by weight of the fluid. The water can be potable or non-potable water.

The water can be brackish or contain other materials typical of sources of water found in or near oil fields. For example, it is possible to use fresh water, brine, or even water to which any salt, such as an alkali metal or alkali earth metal salt ($NaCO_3$, NaCl, KCl, etc.) has been added. The liquid carrier is preferably present in an amount of at least about 80% by weight. Specific examples of the amount of liquid carrier include 80%, 85%, 90%, and 95% by weight.

Experiments of the Invention

In the following microemulsion formulations illustrating different compositional aspects of this invention, the coded material are as follows (a) NIS1 is $C_8$-$C_{10}$ ethoxylated alcohol with five (5) molecules of ethylene oxide (EO) having a low foam generating propensity; (b) NIS2 is a copolymer of ethylene oxide and propylene oxide with HLB=15 having a low foam generating propensity; (c) AIS1 is a $C_{12}$-$C_{13}$ monoalkyl branched propoxy sulfate with four (4) ethylene oxide molecules used to increase cloud point and decrease freezing point, (d) AIS2 is a sodium tridecyl ether sulfate used to increase cloud point and decrease freezing point; (e) $H_2O$ water; (f) IPA is isopropanol or isopropyl alcohol (IPA) used as co-solvent and to decrease the freezing point; (g) dLim is D-limonene; (h) 1 OA is 1-octanol used as co-solvent and deformer, and (i) PPG is polypropylene glycol used as defoamer.

TABLE I

List of Composition of This Invention

| Sample # | NIS1% (w/w) | NIS2% (w/w) | AIS1% (w/w) | $H_2O$ % (w/w) | dLim % (w/w) | IPA % (w/w) | 1OA % (w/w) | PPG % (w/w) |
|---|---|---|---|---|---|---|---|---|
| 1 1810-A | 8 | 10.24 | 0.94 | 56.66 | 5.05 | 11.25 | 1.88 | 6.00 |
| 2 1910-B | 8.3 | 12.46 | 0.5 | 54.56 | 5.05 | 11.25 | 1.88 | 6.00 |
| 3 1809B | 9 | 9 | 3.26 | 63.76 | 4.88 | 4.88 | 0.53 | 4.68 |
| 4 1809C | 9.82 | 9.82 | 1.63 | 63.76 | 4088 | 4.88 | 0.53 | 4.68 |
| 5 1110A | 9.5 | 9.5 | 1.55 | 59.58 | 4.72 | 8 | 0.77 | 6.38 |
| 6 1110B | 9.5 | 9.5 | 1.55 | 57.6 | 4.72 | 10 | 0.77 | 6.38 |
| 7 1110C | 9.4 | 9.4 | 1.55 | 59.9 | 4.84 | 7.63 | 1 | 6.32 |
| 8 1110D | 9.44 | 9.44 | 1.55 | 59.24 | 5.17 | 6.76 | 1.98 | 6.36 |
| 9 1807B2 | 10.63 | 10.63 | 0 | 63.76 | 4.88 | 4.88 | 0.53 | 4.68 |
| 10 1510B | 9.78 | 9.78 | 1 | 57.6 | 4.72 | 10 | 0.77 | 6.38 |
| 11 1510C | 9.72 | 9.72 | 1 | 59.24 | 5.17 | 6.76 | 1.98 | 6.36 |
| 12 3010-E | 9.12 | 9.12 | 0.15 | 62.8 | 5.05 | 5.88 | 1.88 | 6 |
| 13 2410-F | 9.16 | 9.16 | 0.075 | 62.7 | 5.05 | 6 | 1.88 | 6 |

Figure 2:
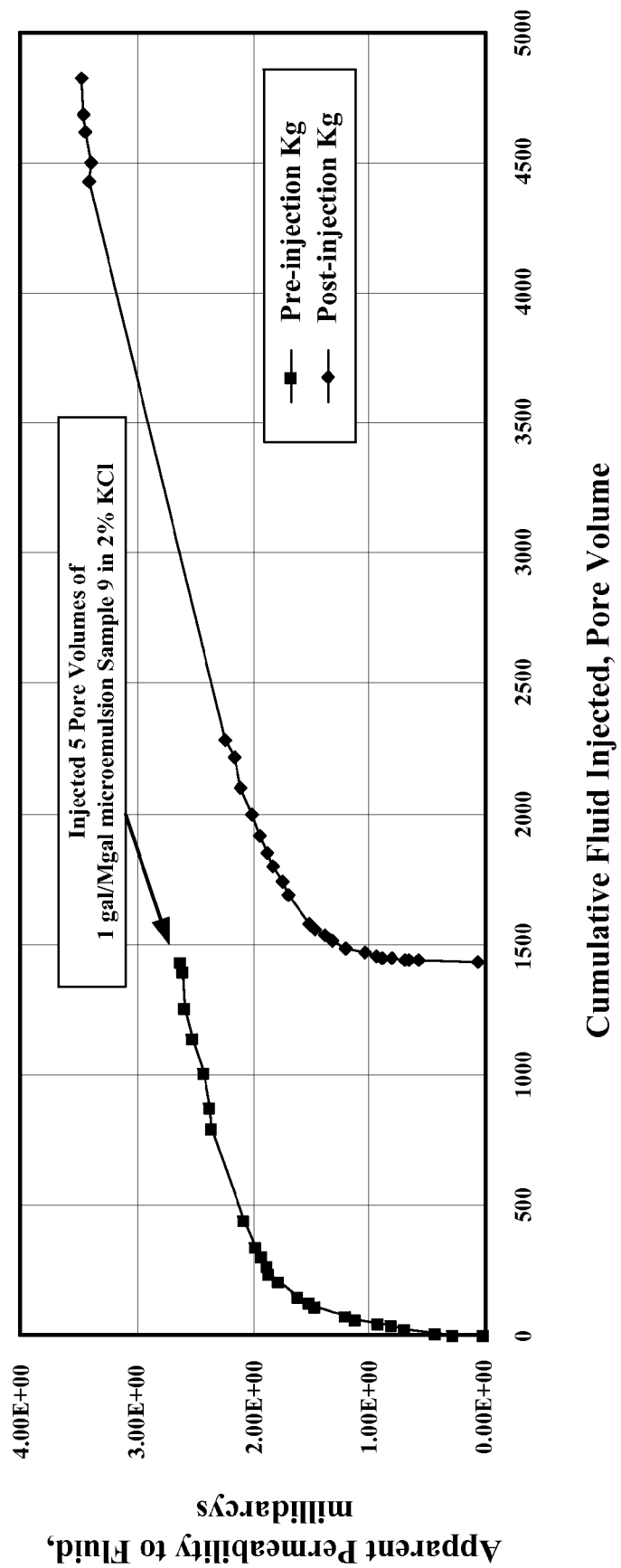
FIG. 2 depicts a plot of apparent permeability to nitrogen in millidarcys versus cumulative fluid injected, before and after treating with 1 gal/Mgal of Sample 9 microemulsion system in berea Sandstone @ 140 F. Permeability to air 8-10 millidarcys.
Figure 3:
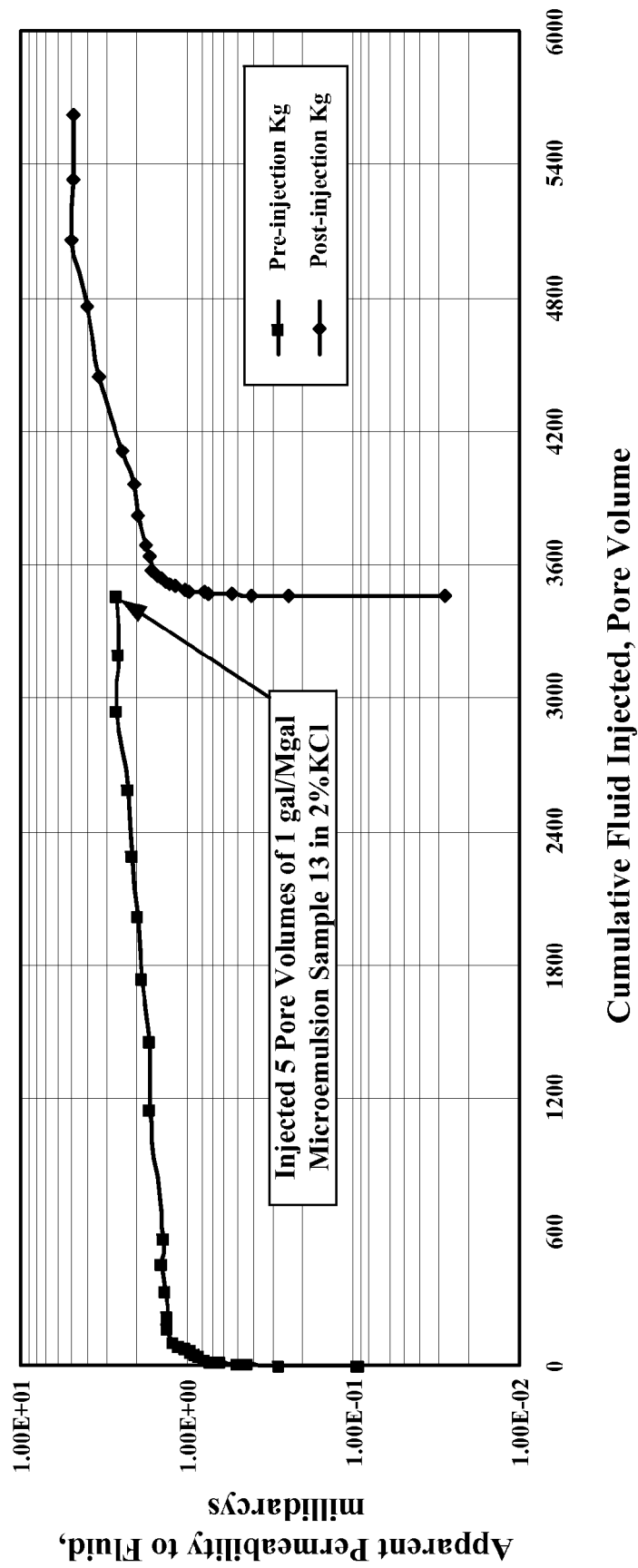
FIG. 3 depicts a plot of apparent permeability to nitrogen in millidarcys versus cumulative fluid injected, before and after treating with 1 gal/Mgal of Sample 13 microemulsion system in berea Sandstone @ 200 F. Permeability to air 8-10 millidarcys.
Figure 4:
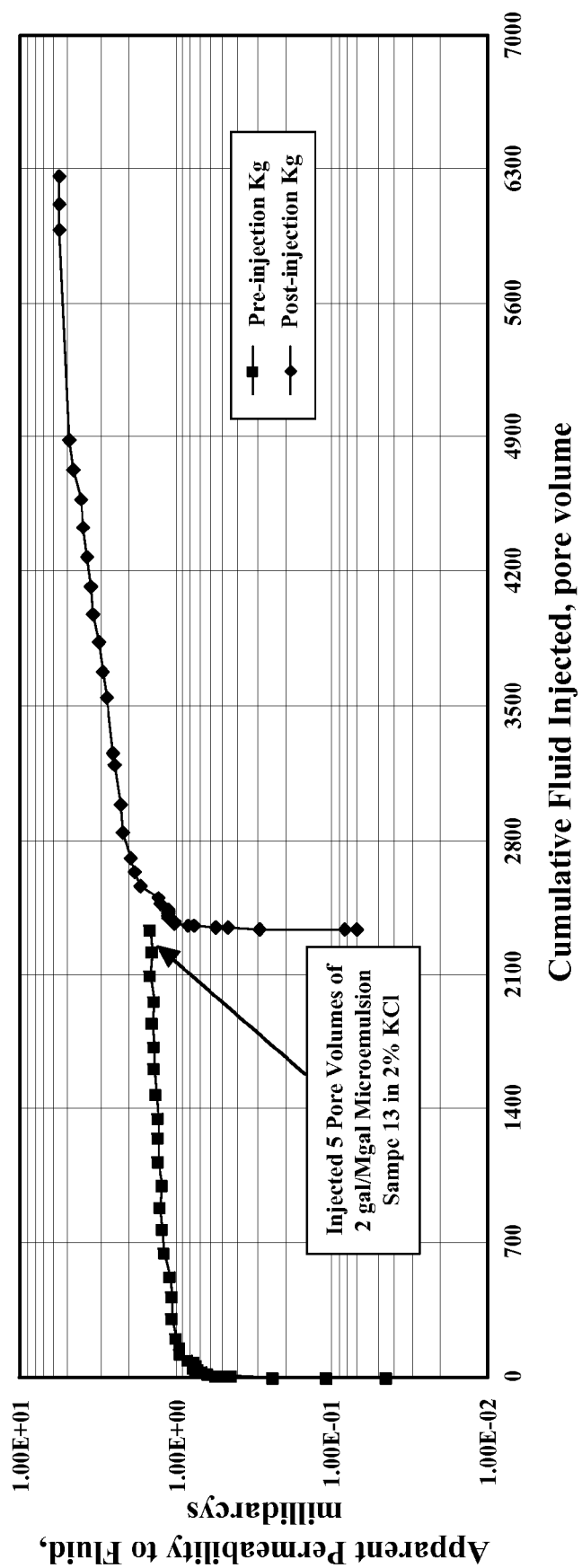
FIG. 4 depicts a plot of apparent permeability to nitrogen in millidarcys versus cumulative fluid injected, before and after treating with 2 gal/Mgal of Sample 13 microemulsion system in berea Sandstone @ 200 F. Permeability to air 8-10 millidarcys.
Figure 5:
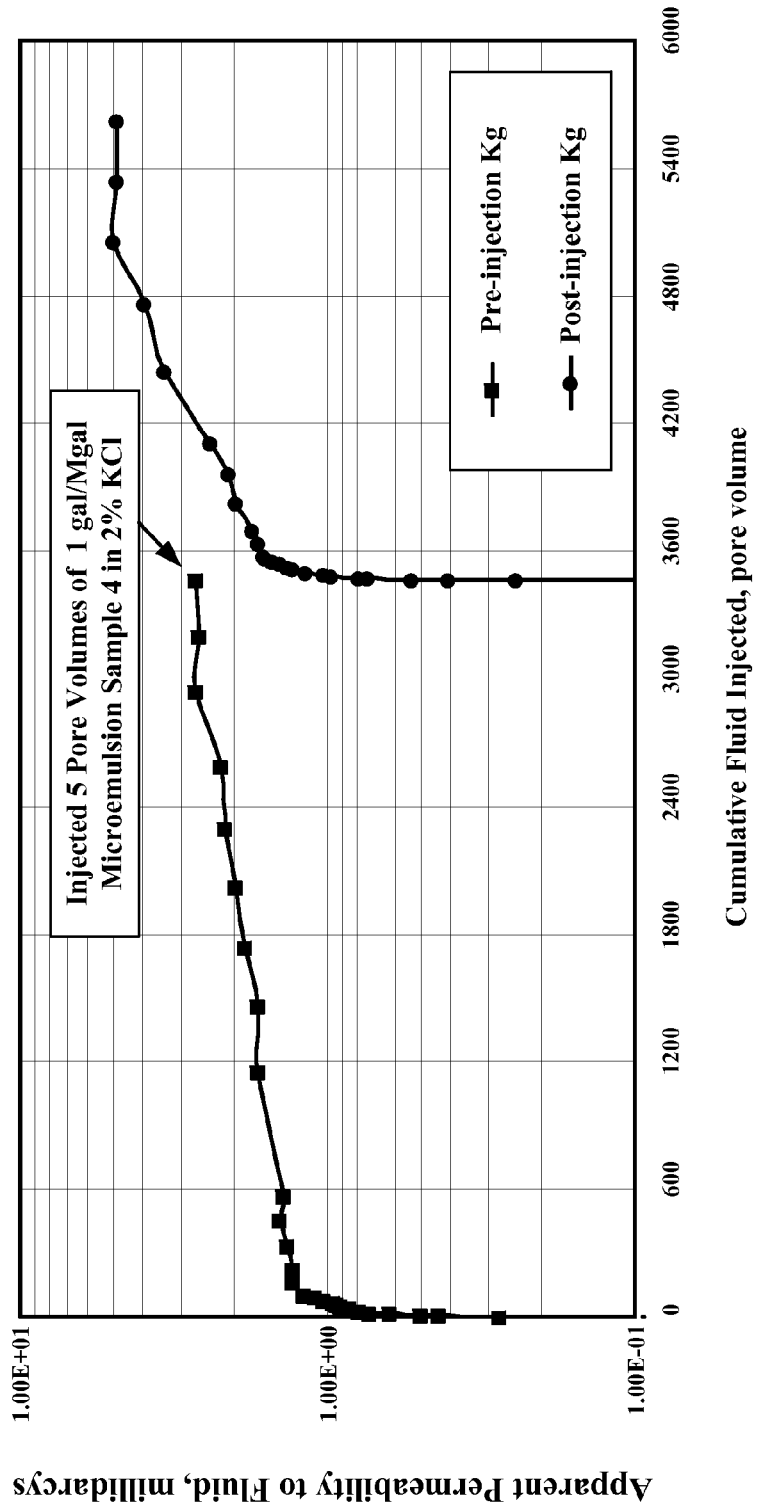
FIG. 5 depicts a plot of apparent permeability to nitrogen in millidarcys versus cumulative fluid injected, before and after treating with 1 gal/Mgal of Sample 4 microemulsion system in berea Sandstone @ 200 F. Permeability to air 8-10 millidarcys.

Referring now to FIG. 1, a port of apparent permeability to nitrogen in millidarcys versus cumulative fluid injected, before and after treating with 1 gal/Mgal of conventional microemulsion system in berea Sandstone @ 140° F. Permeability to air 8-10 millidarcys is shown. Referring now to FIG. 2, a port of apparent permeability to nitrogen in millidarcys versus cumulative fluid injected, before and after treating with 1 gal/Mgal of Sample 9 microemulsion system in berea Sandstone @ 140° F. Permeability to air 8-10 millidarcys is shown. Referring now to FIG. 3, a port of apparent permeability to nitrogen in millidarcys versus cumulative fluid injected, before and after treating with 1 gal/Mgal of Sample 13 microemulsion system in berea Sandstone @ 200° F. Permeability to air 8-10 millidarcys is shown. Referring now to FIG. 4, a port of apparent permeability to nitrogen in millidarcys versus cumulative fluid injected, before and after treating with 2 gal/Mgal of Sample 13 microemulsion system in berea Sandstone @ 200° F. is shown. Referring now to FIG. 5, a port of apparent permeability to nitrogen in millidarcys versus cumulative fluid injected, before and after treating with 1 gal/Mgal of Sample 4 microemulsion system in berea Sandstone @ 200° F. is shown.

It is clear from the above testing data that the post injection data for the microemulsions system of this invention showed a marked positive change in apparent permeability compared to convention system, which actually showed as slight decrease in apparent permeability.

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

We claim:

1. A microemulsion system for treating hydrocarbon producing wells comprising:
    a surfactant subsystem including at least one monoalkyl branched propoxy sulfate anionic surfactant,
    a solvent subsystem including from about 0.1 wt. % and about 50 wt. % of an organic solvent and from about 20 wt. % to about 75 wt. % water, where the organic solvent comprises: (a) benzene, an alkarene, or mixtures thereof, (b) a terpene or a mixture of terpenes, or (c) d-limonene or a mixture of d-limonene and dipentene, and
    a co-solvent subsystem including a mixture of alcohols and at least one polypropylene glycol,
    where the system increase hydrocarbon production and where the hydrocarbon comprises crude oil or gas and crude oil.

2. The system of claim 1, wherein the surfactant subsystem further includes at least one ethoxylated alcohol and at least one ethylene oxide/propylene oxide block copolymer having an HLB value between about 7 and about 15.

3. The system of claim 1, wherein the surfactant subsystem further includes at least one ethoxylated alcohol, at least one ethylene oxide/propylene oxide block copolymer having an HLB value between about 7 and about 15 and at least one alkyl ether sulfate anionic surfactant.

4. The composition of claim 1, wherein the mixture of alcohols includes at least one short chain alcohol having between about 1 and about 4 carbon atoms and at least one longer chain alcohol having between about 6 and about 10 carbon atoms.

5. The composition of claim 1, wherein the mixture of alcohols includes at least one short chain alcohol having between about 2 and about 4 carbon atoms and at least one longer chain alcohol having between about 7 and about 9 carbon atoms.

6. The composition of claim 1, wherein the mixture of alcohols includes isopropyl alcohol and 1-octanol.

7. The composition of claim 1, wherein the organic solvent includes an alkarene or a mixture of alkarenes.

8. The composition of claim 1, wherein the organic solvent includes a terpene or a mixture of terpenes.

9. The composition of claim 1, wherein the organic solvent is d-limonene or dipentene or a mixture of d-limonene and dipentene.

10. The composition of claim 1, wherein:
the surfactant subsystem includes:
one monoalkyl branched propoxy sulfate or a plurality of monoalkyl branched propoxy sulfates,
at least one low foam generating ethoxylated alcohol, and
at least one low foam generating block copolymer or plurality of block copolymers of ethylene oxide and propylene oxide having an HLB value between about 7 and about 15;
the co-solvent subsystem includes:
at least one low molecular weight alcohol,
at least one higher molecular weight alcohol, and
at least one polypropylene glycol; and
the solvent subsystem includes:
an alkarene and a mixture of alkarenes, and
water.

11. The system of claim 1, wherein the surfactant subsystem further includes at least one alkyl ether sulfate anionic surfactant.

12. The composition of claim 10, wherein the at least one low molecular weight alcohol has between about 1 and about 4 carbon atoms and the at least one higher molecular weight alcohol has between about 6 and about 10 carbon atoms.

13. The composition of claim 10, wherein the at least one low molecular weight alcohol has between about 2 and about 4 carbon atoms and the at least one higher molecular weight alcohol has between about 7 and about 9 carbon atoms.

14. The composition of claim 10, wherein the low molecular weight alcohol is isopropyl alcohol and higher molecular weight alcohol is 1-octanol.

15. The composition of claim 1, wherein the organic solvent includes an alkarene or a mixture of alkarenes, where the alkarenes include toluene, xylenes, ethylbenzene, or mixtures of combinations thereof.

16. The composition of claim 1, wherein the organic solvent comprises d-limonene or dipentene.

17. The composition of claim 1, wherein:
the surfactant subsystem includes:
between about 0.1 weight percent and about 10 weight percent of monoalkyl branched propoxy sulfate or a plurality of monoalkyl branched propoxy sulfates,
between about 0.1 weight percent and about 30 weight percent of a low foam generating ethoxylated alcohol comprising a reaction product of an alcohol having between about 8 and about 10 carbon atoms and an average of about 7 ethylene oxide groups per alcohol molecule, and
between about 0.1 weight percent and about 30 weight percent of a low foam generating block copolymer or plurality of block copolymers of ethylene oxide and propylene oxide having a HLB value between about 7 and 15;
the co-solvent subsystem includes:
between about 0.1 weight percent and about 20 weight percent of isopropyl alcohol (IPA),
between about 0.1 weight percent and about 5 weight percent of 1-octanol, and
between about 0.1 weight percent and about 15 weight percent of a polypropylene glycol; and
the solvent subsystem includes:
between about 2 weight percent and about 25 weight percent of d-limonene or dipentene, and
between about 20 weight percent and about 75 weight percent of water.

18. The composition of claim 1, wherein:
the surfactant subsystem includes:
from about 0.5 wt. % to about 30 wt. % at least one ethoxylated alcohol,
from about 0.5 wt. % to about 30 wt. % at least one ethylene oxide (EO)/propylene oxide (PO) copolymer, and
from about 0.1 wt. % to about 10 wt. % at least one monoalkyl branched propoxy sulfate;
the co-solvent system includes:
from about 0.1 wt. % to about 15 wt. % at least one short chain linear alcohol,
from about 0.5 wt. % to about 10 wt. % at least one longer chain linear alcohol, and
from about 0.5 wt. % to about 15 wt. % at least one polypropylene glycol;
the solvent system includes:
from about 0.1 wt. % to about 50 wt. % of at least one terpene and
from about 20 wt. % to about 75 wt. % water.

19. A composition for fracturing a subterranean formation containing crude oil or gas and crude oil and penetrated by a wellbore, the composition comprising:
a fracturing fluid including:
a surfactant subsystem including at least one monoalkyl branched propoxy sulfate anionic surfactant,
a solvent subsystem including from about 0.1 wt. % and about 50 wt. % of an organic solvent and from about 20 wt. % to about 75 wt. % water, where the organic solvent comprises: (a) benzene, an alkarene, or mixtures thereof, (b) a terpene or a mixture of terpenes, or (c) d-limonene or a mixture of d-limonene and dipentene, and
a co-solvent subsystem including a mixture of alcohols and at least one polypropylene glycol,
where the composition increases crude oil or gas and crude oil production.

20. A composition for drilling into a subterranean formation containing crude oil or gas and crude oil, the composition comprising:
a drilling fluid including:
a surfactant subsystem including at least one monoalkyl branched propoxy sulfate anionic surfactant,
a solvent subsystem including from about 0.1 wt. % and about 50 wt. % of an organic solvent and from about 20 wt. % to about 75 wt. % water, where the organic solvent comprises: (a) benzene, an alkarene, or mixtures thereof, (b) a terpene or a mixture of terpenes, or (c) d-limonene or a mixture of d-limonene and dipentene, and
a co-solvent subsystem including a mixture of alcohols and at least one polypropylene glycol.

21. A composition for removing bound water from a producing subterranean formation containing crude oil or gas and crude oil and penetrated by a wellbore, the composition comprising:
a producing fluid including:
a surfactant subsystem including at least one monoalkyl branched propoxy sulfate anionic surfactant,
a solvent subsystem including from about 0.1 wt. % and about 50 wt. % of an organic solvent and from about 20 wt. % to about 75 wt. % water, where the organic solvent comprises: (a) benzene, an alkarene, or mixtures thereof, (b) a terpene or a mixture of terpenes, or (c) d-limonene or a mixture of d-limonene and dipentene, and
a co-solvent subsystem including a mixture of alcohols and at least one polypropylene glycol,
where the composition increases crude oil or gas and crude oil production.

22. A composition for removing bound water from a producing subterranean formation containing crude oil or gas and crude oil and penetrated by a wellbore, the composition comprising:
a surfactant subsystem including at least one monoalkyl branched propoxy sulfate anionic surfactant,
a solvent subsystem including from about 0.1 wt. % and about 50 wt. % of an organic solvent and from about 20 wt. % to about 75 wt. % water, where the organic solvent comprises: (a) benzene, an alkarene, or mixtures thereof, (b) a terpene or a mixture of terpenes, or (c) d-limonene or a mixture of d-limonene and dipentene, and
a co-solvent subsystem including a mixture of alcohols and at least one polypropylene glycol, where the composition increases crude oil or gas and crude oil production.

23. A method for removing bound water from crude oil or gas and crude oil bearing subterranean formations comprising:
injecting into a formation an effective amount of a microemulsion system comprising a surfactant subsystem including at least one monoalkyl branched propoxy sulfate anionic surfactant, a solvent subsystem including from about 0.1 wt. % and about 50 wt. % of an organic solvent and from about 20 wt. % to about 75 wt. % water, where the organic solvent comprises: (a) benzene, an alkarene, or mixtures thereof, (b) a terpene or a mixture of terpenes, or (c) d-limonene or a mixture of d-limonene and dipentene, and a co-solvent subsystem including a mixture of alcohols and at least one polypropylene glycol,
where the effective amount being sufficient to remove water blocks and to enhance formation production.

24. The method of claim 23, further comprising:
maintaining the system in the formation for a time from about 8 to about 96 hours.

25. The method of claim 23, further comprising:
producing fluids from the formation including the microemulsion system.

26. The method of claim 23, further comprising:
maintaining the system in the accessible portions for a time from about 8 to about 96 hours.

27. A method for fracturing a formation containing crude oil or gas and crude oil comprising:
pumping, into a producing formation at a pressure sufficient to fracture the formation and to enhance productivity, a fracturing fluid comprising:
a proppant and
a microemulsion system including a surfactant subsystem including at least one monoalkyl branched propoxy sulfate anionic surfactant, a solvent subsystem including from about 0.1 wt. % and about 50 wt. % of an organic solvent and from about 20 wt. % to about 75 wt. % water, where the organic solvent comprises: (a) benzene, an alkarene, or mixtures thereof, (b) a terpene or a mixture of terpenes, or (c) d-limonene or a mixture of d-limonene and dipentene, and a co-solvent subsystem including a mixture of alcohols and at least one polypropylene glycol,
where the proppant props open the formation after fracturing, and
where the microemulsion system reduces water blocks and water blocking in the formation.

28. A method for fracturing a formation containing crude oil or gas and crude oil comprising the step of:
pumping a fracturing fluid into a producing formation at a pressure sufficient to fracture the formation and to enhance productivity,
pumping in a proppant fluid including:
a proppant and
a microemulsion system comprising a surfactant subsystem including at least one monoalkyl branched propoxy sulfate anionic surfactant, a solvent subsystem including from about 0.1 wt. % and about 50 wt. % of an organic solvent and from about 20 wt. % to about 75 wt. % water, where the organic solvent comprises: (a) benzene, an alkarene, or mixtures thereof, (b) a terpene or a mixture of terpenes, or (c) d-limonene or a mixture of d-limonene and dipentene, and a co-solvent subsystem including a mixture of alcohols and at least one polypropylene glycol,
where the proppant props open the formation after fracturing, and
where the microemulsion system reduces water blocks and water blocking in the formation.

29. A method for fracturing a formation containing crude oil or gas and crude oil comprising the step of:
pumping a fracturing fluid into a producing formation at a pressure sufficient to fracture the formation and to enhance productivity,
pumping in a proppant fluid including a proppant, where the proppant props open the formation after fracturing and
pumping a microemulsion system comprising a surfactant subsystem including at least one monoalkyl branched propoxy sulfate anionic surfactant, a solvent subsystem including from about 0.1 wt. % and about 50 wt. % of an organic solvent and from about 20 wt. % to about 75 wt. % water, where the organic solvent comprises: (a) benzene, an alkarene, or mixtures thereof, (b) a terpene or a mixture of terpenes, or (c) d-limonene or a mixture of d-limonene and dipentene, and a co-solvent subsystem including a mixture of alcohols and at least one polypropylene glycol, where the microemulsion system reduces water blocks and water blocking in the formation.

30. A method for producing a formation containing crude oil or gas and crude oil comprising:
circulating and/or pumping into a well on production a fluid including a microemulsion system comprising a surfactant subsystem including at least one monoalkyl branched propoxy sulfate anionic surfactant, a solvent subsystem including from about 0.1 wt. % and about 50 wt. % of an organic solvent and from about 20 wt. % to about 75 wt. % water, where the organic solvent comprises: (a) benzene, an alkarene, or mixtures thereof, (b)

a terpene or a mixture of terpenes, or (c) d-limonene or a mixture of d-limonene and dipentene, and a co-solvent subsystem including a mixture of alcohols and at least one polypropylene glycol, where the microemulsion system reduces water blocks and water blocking in the formation.

31. A method for drilling a formation containing crude oil or gas and crude oil comprising:

circulating and/or pumping into a well during drilling a fluid including a microemulsion system comprising a surfactant subsystem including at least one monoalkyl branched propoxy sulfate anionic surfactant, a solvent subsystem including from about 0.1 wt. % and about 50 wt. % of an organic solvent and from about 20 wt. % to about 75 wt. % water, where the organic solvent comprises: (a) benzene, an alkarene, or mixtures thereof, (b) a terpene or a mixture of terpenes, or (c) d-limonene or a mixture of d-limonene and dipentene, and a co-solvent subsystem including a mixture of alcohols and at least one polypropylene glycol, where the microemulsion system reduces fines and debris in the borehole during drilling.

* * * * *